United States Patent [19]
Shin et al.

[11] Patent Number: 5,987,134
[45] Date of Patent: Nov. 16, 1999

[54] DEVICE AND METHOD FOR AUTHENTICATING USER'S ACCESS RIGHTS TO RESOURCES

[75] Inventors: Kil-ho Shin; Kenichi Kobayashi; Toru Aratani, all of Ashigarakami-gun, Japan

[73] Assignee: Fuji Xerox Co., Ltd., Tokyo, Japan

[21] Appl. No.: 08/805,151

[22] Filed: Feb. 24, 1997

Related U.S. Application Data

[63] Continuation-in-part of application No. 08/731,928, Oct. 18, 1996, abandoned.

[30] Foreign Application Priority Data

Feb. 23, 1996 [JP] Japan ....................................... 8-62076
Jan. 6, 1997 [JP] Japan ....................................... 9-000418

[51] Int. Cl.$^6$ ............................................................ H04L 9/00
[52] U.S. Cl. ............................................... 380/25; 380/30
[58] Field of Search ........................................ 380/9, 30, 23, 380/25

[56] References Cited

U.S. PATENT DOCUMENTS

| | | | |
|---|---|---|---|
| 4,926,480 | 5/1990 | Chaum | 380/30 |
| 5,191,611 | 3/1993 | Lang | 380/30 |

FOREIGN PATENT DOCUMENTS

| | | |
|---|---|---|
| 3-100753 | 4/1991 | Japan . |
| 5-68727 | 9/1993 | Japan . |
| 5-75135 | 10/1993 | Japan . |

OTHER PUBLICATIONS

*Elektronik*, M. Buchheit, "Software–Kopierschutz", 1992, vol. 41, pp. 68–74.

*Elektronik*, M. Keul, ""Dongles": Hardware Schutzt Software", 1990, vol. 39, pp. 82–84and 86.

*Primary Examiner*—Salvatore Cangialosi
*Attorney, Agent, or Firm*—Oliff & Berridge, PLC

[57] ABSTRACT

The present invention provides a device for authenticating user's access rights to resources, which comprises first memory means for storing challenging data, second memory means for storing unique identifying information of the user, third memory means for storing proof support information which is a result of executing predetermined computations to the unique identifying information of the user and unique security characteristic information of the device, response generation means for generating a response from the challenging data stored in the first memory means, the unique identifying information stored in the second memory means and the proof support information stored in the third memory means, and verification means for verifying the legitimacy of the response by verifying that the response, the challenging data and the unique security characteristic information of the device satisfy a specific predefined relation.

67 Claims, 23 Drawing Sheets

DEVICE AND METHOD FOR AUTHENTICATING USER'S ACCESS RIGHTS TO RESOURCES

This is a Continuation-in-Part of Application Ser. No. 08/731,928, filed Oct. 18, 1996, now abandoned.

BACKGROUND OF THE INVENTION

1. Field of the Invention

The present invention relates to a device for authenticating user's access rights to resources.

2. Discussion of the Related Art

Program execution control technologies are known in the field to which the present invention belongs. The program execution control technologies are technologies to:

1. Embed a routine for user authentication during the use of an application program;
2. Have the routine examine whether the user attempting execution of the application possesses a key for proper authentication; and
3. Continue the program only when the existence of the key for authentication is verified, otherwise to halt execution.

By using these technologies, execution of the application program is enabled only for proper users having the authentication key. The technologies are commercialized in the software marketing field, two examples being Sentine/SuparPro (trade mark) from Rainbow Technologies, Inc. and HASP (trade mark) from Aladdin Knowledge Systems, Ltd.

In the use of program execution control technologies, a user who executes software possesses an authentication key as user identification information. The authentication key is a key for encryption and is distributed to the user by a party who allows use of software, a software vender, for example. The authentication key is securely sealed in a memory, or the like, of hardware to prevent duplication, and is delivered to the user using physical means such as the postal service. The user mounts personal computer/workstation using a designated method. When the user starts up the application program and when the execution of the program reaches the user authentication routine, the program communicates with the hardware in which the authentication key of the user is embedded. Based on the results of the communication, the program identifies the authentication key, and moves the execution to the following step upon confirmation of existence of the correct authentication key. If the communication fails and the verification of the existence of the authentication key is not established, the program stops automatically, discontinuing the execution of subsequent steps.

Identification of the authentication key by the user authentication routine is executed according to the following protocol, for example:

1. The user authentication routine generates and transmits an appropriate number to the hardware in which the key is embedded.
2. The hardware in which the key is embedded encrypts the number using the embedded authentication key and transmits it back to the authentication routine.
3. The authentication routine determines whether or not the number transmitted back is the number expected beforehand, or, in other words, the number obtained by encrypting the number with a correct authentication key.
4. If the number transmitted back coincides with the expected number, the execution of the program is continued, otherwise the execution is halted.
5. In this case, communication between the application program and the hardware in which the authentication key is embedded must be different for each execution even if it is between the same location in the same application with the same hardware.

Otherwise, a user who does not possess the correct authentication key may be able to execute the program by recording once the content of communication during the normal execution process, and by responding to the application program according to the recording each time the subsequent program is executed. Such improper execution of the application program by replaying the communication content is called a replay attack.

In order to prevent a replay attack, in general, a random number is generated and used for each communication as the number to be transmitted to the hardware in which the key is embedded.

SUMMARY OF THE INVENTION

The present invention has been made in view of the above circumstances and has an object to provide a device for authenticating user's access rights to resources and its method which set both users and the protecting side such as application providers free from inconveniences caused by handling of large amount of unique information, for example, a lot of authentication keys, and thereby user's access rights are easily and simply authenticated when the execution control of the program, privacy protection of electronic mails, access control of files or computer resources and so forth are carried out.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, one aspect of a device for authenticating user's access rights to resources of the present invention comprises first memory means for storing challenging data, second memory means for storing unique identifying information of the user, third memory means for storing proof support information which is a result of executing predetermined computations to the user unique identifying information and unique security characteristic information of the device, response generation means for generating a response from the challenging data stored in the first memory means, the unique identifying information stored in the second memory means and the proof support information stored in the third memory means, and verification means for verifying the legitimacy of the response by verifying that the response, the challenging data and the unique security characteristic information of the device satisfy a specific predefined relation.

With the above constitution, the unique security characteristic information of the device assigned to the protecting side and the unique identifying information of the user are made to be independent of each other. The information on actual access rights is represented as proof support information (i.e., an access ticket). The user has the user unique identifying information in advance, and on the other hand, a protector, such as a program creator prepares the unique security characteristic information, or the counterpart of the unique security characteristic information in terms of the public key cryptography, independent of the user unique identifying information held by the user. An access ticket is generated based on the user unique identifying information and the unique security characteristic information used in creation of the application program or the like. Access tickets are distributed to the users, whereby authentication of the user's access rights to resources such as execution control can be performed. Thus complexity occurring in the case where both sides of user and protector use the same information for performing authentication can be avoided.

Moreover, in the above constitution, at least the second memory means and the response generation means may be confined in the protect means which prevents any data inside from being observed or being tampered with from the outside. It may also be possible to implement at least the second memory means and the response generation means within a small portable device such as a smart card.

The response generating means may comprise first calculation means and second calculation means, wherein the first calculation means executes predetermined calculations to the user unique identifying information stored in the second memory means and the proof support information stored in the third memory means to obtain the unique security characteristic information as a result, and the second calculation means executes predetermined calculations to the challenging data stored in the first memory means and the unique security characteristic information calculated by the first calculation means to generate the response as a result of calculation.

The above-described response generation means may comprise third calculation means, fourth calculation means and fifth calculation means. The third calculation means executes predetermined calculations to the challenging data stored in the first memory means and the proof support information stored in the third memory means, the fourth calculation means executes predetermined calculations to the challenging data stored in the first memory means and the user unique identifying information stored in the second memory means, and the fifth calculation means executes predetermined calculations to the results of calculation by the third and fourth calculation means, whereby the response is generated. In this case, at least the second memory means and the fourth calculation means can be confined within the protect means which prevents any data inside from being observed or being tampered with from the outside. At least the second memory means and the fourth calculation means may be implemented within a small portable device such as a smart card.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENTS

At first, an example of the fundamental constitution of the present invention is described. The user authentication system of the example can be applied to privacy protection of electronic mails or control of access to files or computer resources as well as control of execution of applications.

Figure 1:
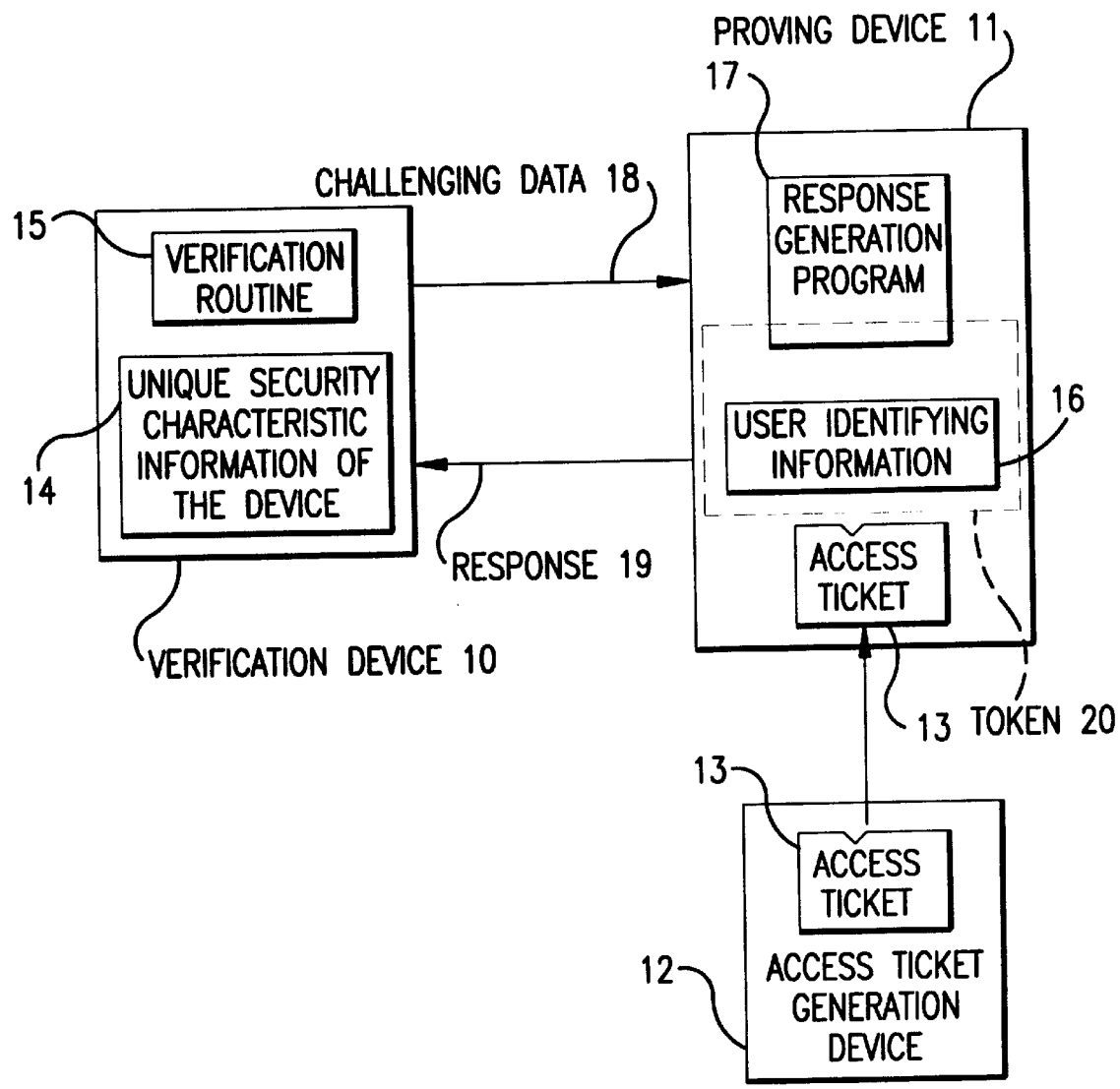
FIG. 1 is a block diagram showing an example of the fundamental constitution of the present invention.
Figure 2:
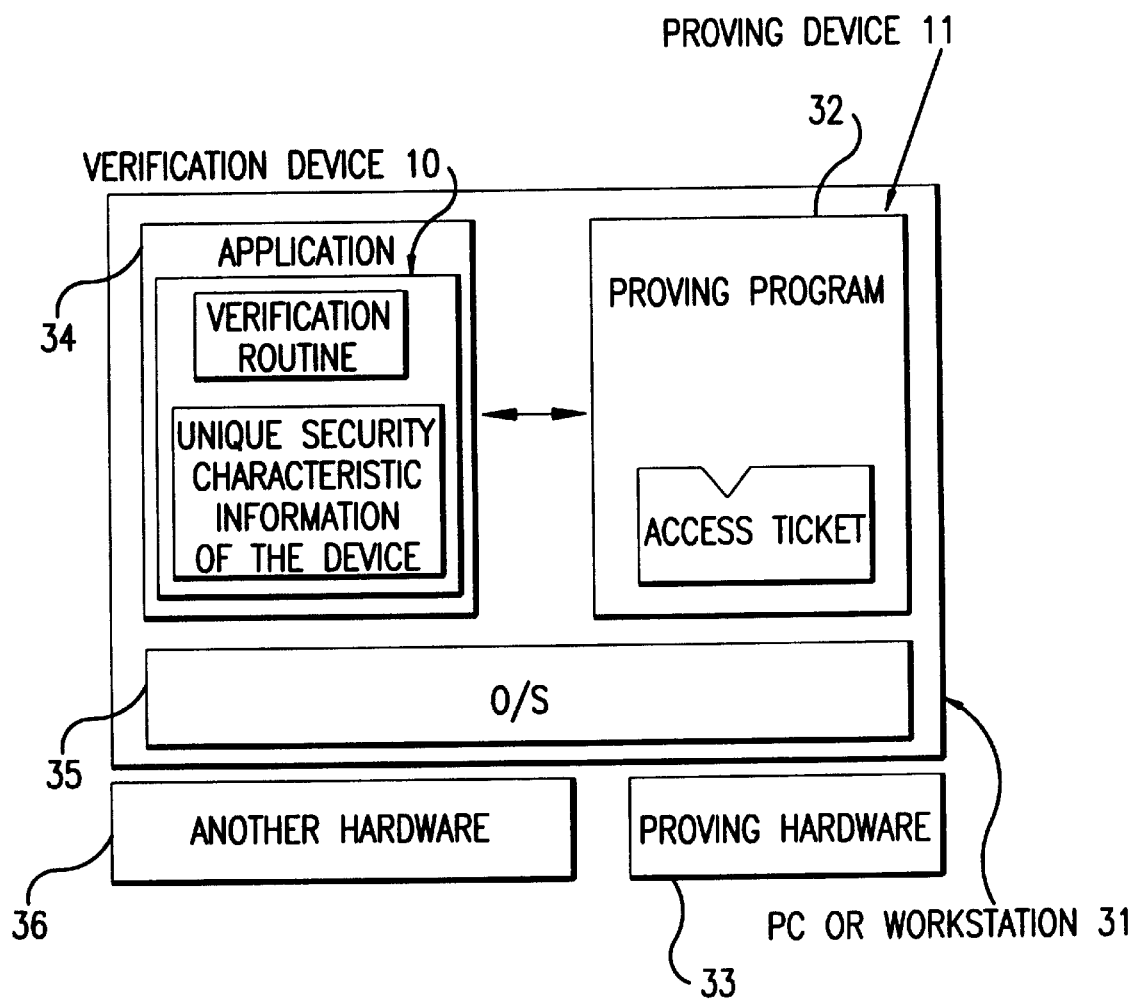
FIG. 2 is a block diagram showing an example of the constitution of the present invention in case that an entire device is implemented within a single PC.

In FIG. 1, the user authentication system comprises a verification device 10 and a proving device 11: the proving device 111 receives an access ticket (proof support data) from an access ticket generation device 12; the verification device 10 executes a verification routine 15; the proving device 11 retains user identifying information 16 and the access ticket 13 and executes a response generation program 17.

The access ticket generation device 12 is installed in the protector side, such as an application provider. The access ticket generation device 12 generates the access ticket 13 based on unique security characteristic information of the device 14 and the user identifying information 16 and the access ticket 13 is forwarded to the user through communication or sending of a floppy-diskette or the like to be retained by the proving device 11 of the user. Then the verification devices 10 sends challenging data 18 to the proving device 11. The proving deice 181 generates a response 19 by utilizing the access ticket 13 and the user identifying information 16, and returns it to the verification device 10. The verification device 10 verifies the legitimacy of the response based on the challenging data, that is, the verification device 10 verifies that the response has been generated based on the challenging data and the unique security characteristic information of the device.

If the legitimacy of the response is verified, the access rights of the user is authenticated; accordingly, continuation of execution of a program, access to files, and so forth, are permitted.

With the above constitution, an example of execution control of an application program is now described.

In the above constitution, a user of an application program retains only one piece of user identifying information 16. The user identifying information is equivalent to a password in the password authentication and is unique, significant information which identifies the user. If it is possible for the user to copy and distribute the user identifying information 16, it will lead to the use of the application program by the user without legitimate access rights; therefore, the user identifying information 16 is protected by protection means so that even the user who is a legitimate owner of the user identifying information 16 cannot steal it. The protection means may be a hardware with a protecting effect (hereinafter referred to as tamper-resistant hardware) against theft of the inside conditions by external probes. A method of implementation of the tamper-resistant hardware will be described later.

In addition to the user identifying information 16, the response generation program 17 which executes predetermined computations is provided to the user. The program 17 performs communication with a user authentication routine (verification routine 15): on receiving two parameters, namely, the user identifying information 16 and the access ticket 13, the program 17 executes computations to arbitrary inputted values to generate the response 19 for identifying the user. The user identifying information 16 is used in the course of the computation, and it is required to protect at least a part of the program 17 by the protection means since leakage of the user identifying information 16 to the outside will cause a problem by the above-described reason.

Hereinafter, memory means for storing the user identifying information and a part of the program which are protected by the protection means, device for executing the part of the program (for example, consisting of a memory and a MPU) and the protection means are integrally referred to as token (shown by the reference numeral 20 in FIG. 1). The token may have portability, like a smart card.

Similar to the conventional execution control technologies, the verification routine 15 is set to the application program. The verification routine 15 is same as that of the conventional technologies in that it communicates with the response generation program 17 retained by the user, and continues execution of the program if and only if a returned result (response 18) is correct. Therefore, it is necessary that the program creator knows the method of computing the combination of transferred data (challenging data 18) and correct returned data corresponding thereto (response 19).

Some examples of functions of the verification routine 15 are explained as follows:

1. Data to be transferred (challenging data 18) and expected returned data (expected value) are embedded in the verification routine 15. The verification routine 15 fetches the data to be transferred and transfers it to the user, and receives the returned data from the user. Then the verification routine 15 compares the returned data from the user with the expected value: if they are identical with each other, the verification routine 15 executes the next step of the program; if they are not identical, the verification routine 15 halts the execution of the program.

In the case where the returned data is assumed to be a result of encryption of the transferred data in accordance with a predetermined encryption algorithm, the unique security characteristic information of the device is an encryption key.

2. Data to be transferred (challenging data 18) and data generated by applying a one-way function to expected returned data (expected value) are embedded in the verification routine 15. The verification routine 15 fetches the data to be transferred and transfers it to the user, and receives the returned data from the user. Then the verification routine 15 compares data generated by applying the one-way function to the returned data from the user with the expected value: if they are identical with each other, the verification routine 15 executes the next step of the program; if they are not identical, the verification routine 15 halts the execution of the program.

In the case where the returned data is assumed to be a result of encryption of the transferred data in accordance with a predetermined encryption algorithm, the unique security characteristic information of the device is an encryption key.

3. Protection is provided by encrypting a part of code of the application program in accordance with a predetermined encryption algorithm so that execution of the program may be impossible. The verification routine 15 transfers the encrypted code to the user and receives returned data from the user, and then replace the received value with the encrypted code.

With this constitution, execution of the program may be possible if and only if the returned data is a correct decryption of the encrypted code. In this case, the unique security characteristic information is a decryption key for decrypting the encrypted code.

4. Protection is provided by encrypting a part of code of the application program in accordance with a predetermined encryption algorithm so that execution of the program may be impossible. Moreover, data generated by encrypting a decryption key paired with the encryption key used for encrypting the code is embedded as transferred data in the verification routine 15. The verification routine 15 transfers the encrypted decryption key to the user and receives returned data from the user, and then decrypts the encrypted code with the value of the received data as a decryption key.

With this constitution, the encrypted code is correctly decrypted if and only if the returned data is a decryption key which has been correctly decrypted, and accordingly execution of the program becomes possible. In this case, the unique security characteristic information of the device is a decryption key for decrypting the encrypted decryption key.

In the conventional execution control technologies, the user identifying information (authentication key of the user) is identical with the unique security characteristic information of the device. The conventional response generation routine receives the unique security characteristic information and the data transferred from the verification routine as the input, and then executes computations thereto for generating data to be returned.

By contrast, the present invention is characterized in that the user identifying information 16 and the unique security characteristic information of the device 14 are independent of each other. In this constitutional example, the response generation program 17 adds the access ticket 13 to the user identifying information 16 and the data transferred from the verification routine 15 (challenging data 18) as the input, and then executes predetermined computations to them for generating the data to be returned (response 19). The constitution has the following properties:

1. The access ticket 13 is the data calculated based on the specific user identifying information 16 and the unique security characteristic information of the device.

2. At least from the viewpoint of the computation amount, it is impossible to calculate the unique security characteristic information from the access ticket 13 without knowing the user identifying information 16.

3. The response generation program 17 executes computations for generating correct data to be returned if and only if a correct combination of the user identifying information 16 and the access ticket 13. Note that the access ticket 13 has been calculated based on the user identifying information 16.

With the constitution described so far, the execution control can be carried out by the following steps: the user has the user identifying information 16 in advance; the program creator prepares the application program independent of the user identifying information 16 retained by the user; and the program creator generates the access ticket 13 based on the user identifying information 16 and the unique security characteristic information of the device 16 used in creating the application program and distributes the access ticket 13 to the user.

It may be possible to constitute the user identifying information 16 by two pieces of user identifying information for distinguishing the information used for preparing the access ticket 13 from the information used in a communication program by the user. In the most representative example, the user identifying information 16 is made to be a public key pair: the public key is published to be used for generating the access ticket; and the individual key is confined within the token 20 as user's individual secret information. In this case, it is possible to calculate the access ticket 13 while the user identifying information 16 is kept secret by calculating the access ticket 13 from the unique security characteristic information 14 and the public key of the public key pair.

First Embodiment

In a first embodiment, an access ticket t is defined as the relation (1).

$$t = D - e + \omega \phi(n) \quad (1)$$

In the following bulleted paragraphs, symbols used in the above relation are described.

An integer n is an RSA modulus, hence, a product of two very large prime numbers p and q (n=pq).

$\phi(n)$ denotes the Euler number of n, hence, a product of two integers p−1 and q−1 ($\phi(n)=(p-1)(q-1)$).

A piece of user identifying information e is an integer allocated to each user. A piece of user identifying information is unique to a user: a different user identifying information is allocated to a different user.

An access-ticket secret key D is a private key of an RSA public key pair. Since the modulus is assumed to be n, the relation 2 is derived from the definition.

$$\gcd(D, \phi(n)) = 1 \quad (2)$$

In the above, gcd (x, y) denotes the greatest common divisor of two integers x and y. The existence of an integer E satisfying the relation (3), which is called an access-ticket public key, is derived from the relation (2).

$$ED \bmod \phi(n) = 1 \quad (3)$$

$\omega$ is an integer dependent upon both n and e. It is required that a probably different value will be allocated to $\omega$ if at least one of n and e is different. In defining $\omega$ in a consistent manner, a one-way hash function h may be used.

$$\omega = h(n|e) \quad (4)$$

In the relation (4), n|e denotes the concatenation of the two bitstring representations of n and e. A one way hash function h is a function having the property that it is extremely difficult to calculate two distinct x and y satisfying h(x)=h(y). Known examples of one-way hash functions are the MD2, MD4 and MD5 of RSA Data Securities Inc., and the standard SHS (Secure Hash Standard) of the U.S. federal government.

Figure 3:
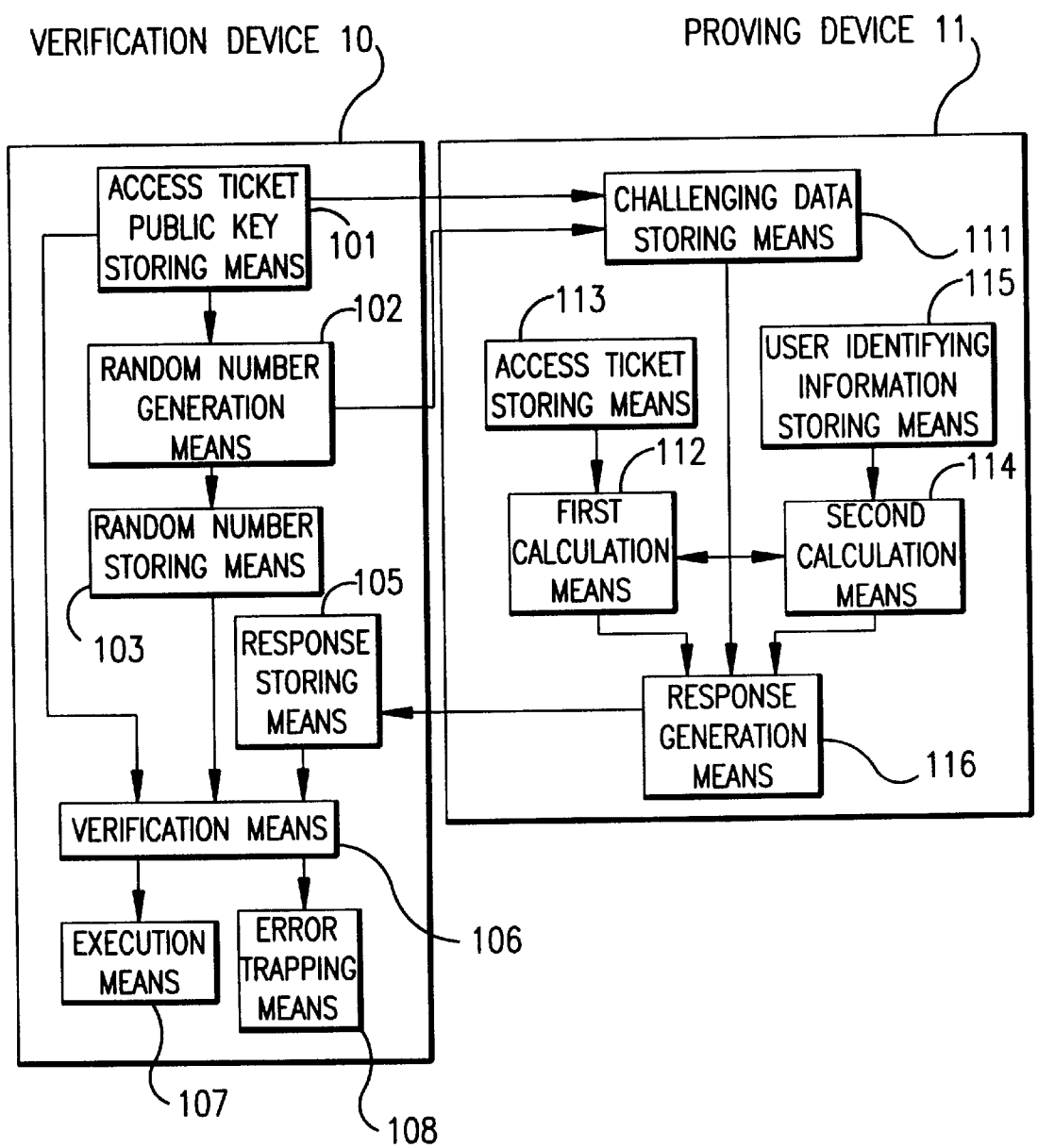
FIG. 3 is a block diagram showing the constitution of a first embodiment of a device for authenticating user's access rights to resources according to the present invention.
Figure 4:
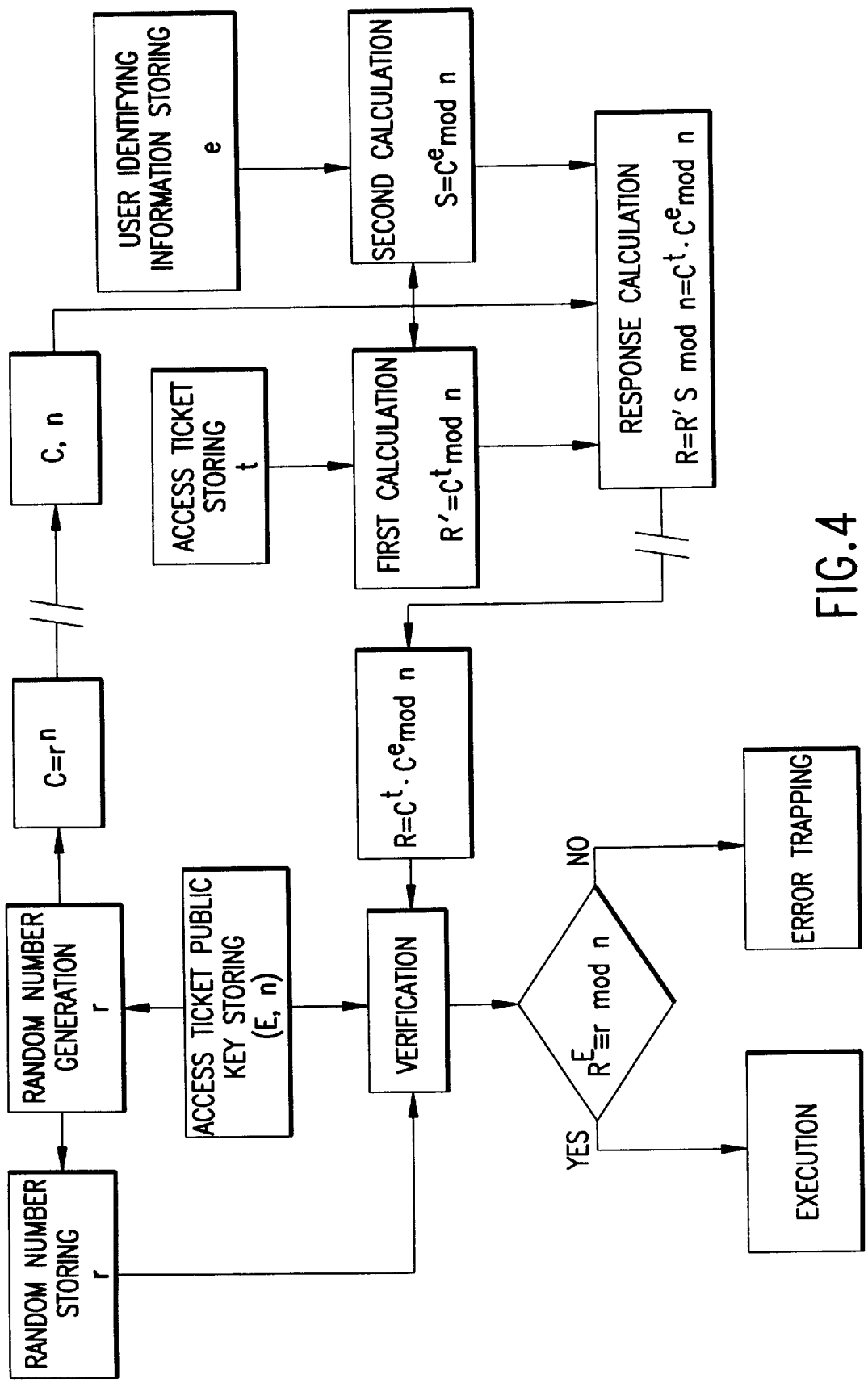
FIG. 4 is a flow chart showing functions of means constituting the devices of the first embodiment.

Among the above numbers, t, E and n can be open to public without any risk, while the rest of the numbers, namely D, e, $\omega$, p, q and $\phi(n)$, are to be kept secret to everybody but those who are allowed to generate an access ticket. FIG. 3 depicts the constitution of the first embodiment. A verification device 10 comprises the followings: an access ticket public key storing means 101; a random number generation means 102; a random number storing means 103; a response storing means 105; a verification means 106; an execution means 107; and an error trapping means 108. On the other hand, a proving device 11 comprises the followings: a challenging data storing means 111; a first calculation means 112; an access ticket storing means 113; a second calculation means 114; a user identifying information storing means 115; and a response generation means 116.

By the following numbered paragraphs, the function of the means constituting the devices will be described.

1. The verification device 10 is invoked by a user. The way to invoke the device varies depending upon how the device is implemented. A few examples are now shown. First, the verification device 10 may be implemented as a part of an application program to be installed and executed on a user's PC or workstation. In this case, the user may invoke the verification device 10 by invoking the application program in ordinary ways. For example, the user may click the iconic symbol representing the application program on the computer screen with a pointing device such as a mouse, or may use a keyboard. The verification device 10 may be implemented as a program installed and executed on a server computer that is connected to a user's PC or workstation by means of computer network. In this case, in order to invoke the verification device 10, a user first invokes a communication program installed on his/her own PC or workstation: the communication program establishes a connection to the server, and asks the server to invoke the verification device 10. When the communication program and the server follow the TCP/IP protocols, for instance, the verification device 10 is allocated to a predefined port number on the server computer. When the communication program issues a requirement for establishing a connection to the port, inetd, a demon program running on the server computer, receives the requirement. After checking which program is allocated to the specified port, it finally invokes the verification device 10, and establishes a connection between the verification device and the communication program. This way of implementation is very common in net worked computer systems like Internet. The verification device 10 may be implemented as a program written on a ROM or EEPROM within a smart card reader-writer. In this case, the proving device 11 is a program installed on an IC chip of a smart card; the verification device 10 is invoked whenever a user inserts his/her smart card into the smart card reader-writer.

2. The verification device 10 sends challenging data C and a modulus n to the challenging data storing means 111 of the proving device 11. The modulus n is stored in the access-ticket public key storing means 101. On the other hand, challenging data C is generated as follows: the random number generation means 102 generates a random integer r so that r and the modulus n are relatively prime (gcd(r, n)=1); the generated random integer r is stored in the random number storing means 103; finally, the random number generation means 102 sets the value of C to r. As stated later in more detail, the response which the proving device 11 is to respond to the verification device 10 is RSA-encryption of r with D as the key and n as the modulus. Since the value of C is identical to the random integer r, it varies with occurrence of communication between the verification device 10 and the proving device 11. This prevents so-called replay attack from succeeding.

3. The first calculation means 112 of the proving device 11 calculates an intermediate result R' according to the relation (5). An access ticket t to be used is stored in the access ticket storing means 113.

$$R' = C^t \bmod n \quad (5)$$

4. The second calculation means 114 of the proving device 11 calculates a differential S according to the relation (6). A user identifying information e to be used is stored in the user identifying information storing means 115.

$$S = C^e \bmod n \quad (6)$$

5. Receiving R' and S from the first calculation means 112 and the second calculation means 114, the response generation means 116 of the proving device 11 calculates a response R according to the relation (7).

$$R = R'S \bmod n \quad (7)$$

6. The proving device 11 returns the generated response R to the response storing means 105 of the verification device 10.

7. The verification means 106 of the verification device 10 first performs the calculation (8). Both the exponent E and the modulus n are stored in the access ticket public key storing means 101, and the response R is stored in the response storing means 105.

$$R^E \bmod n \quad (8)$$

Finally, the verification means 106 examines the relation (9).

$$C \bmod n = R^E \bmod n \quad (9)$$

If the relation (9) holds, the verification means invokes the execution means 107. The execution means 107 provides a user with utilities that he/she wanted to access to. Otherwise, it invokes the error trapping means 108. The error trapping means 108 may deny user access by terminating the execution.

Second Embodiment

A second embodiment to be described is the same as the first embodiment regarding the definition of an access ticket t and the function of the proving device. However, the verification device works differently. The difference in the roles between challenging data C and a response R causes the difference in the function between the two embodiments: in the first embodiment, a response R is encryption of a random challenging data C; in the second embodiment, a response R will be decryption of challenging data C which is encryption of some other meaningful data.

Figure 5:
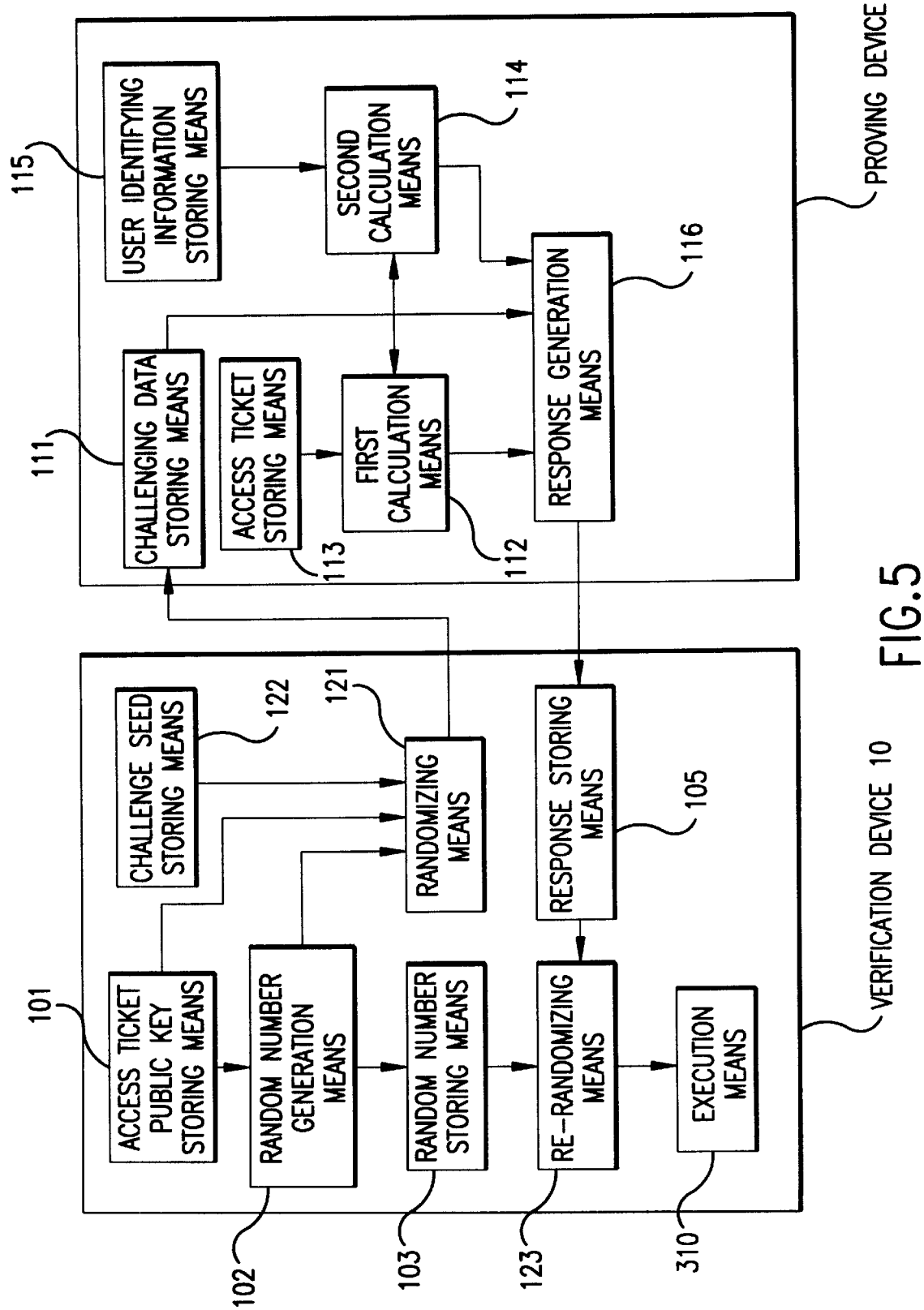
FIG. 5 is a block diagram showing the constitutions of a verification device and a proving device of a second embodiment of the device for authenticating user's access rights to resources according to the present invention.
Figure 6:
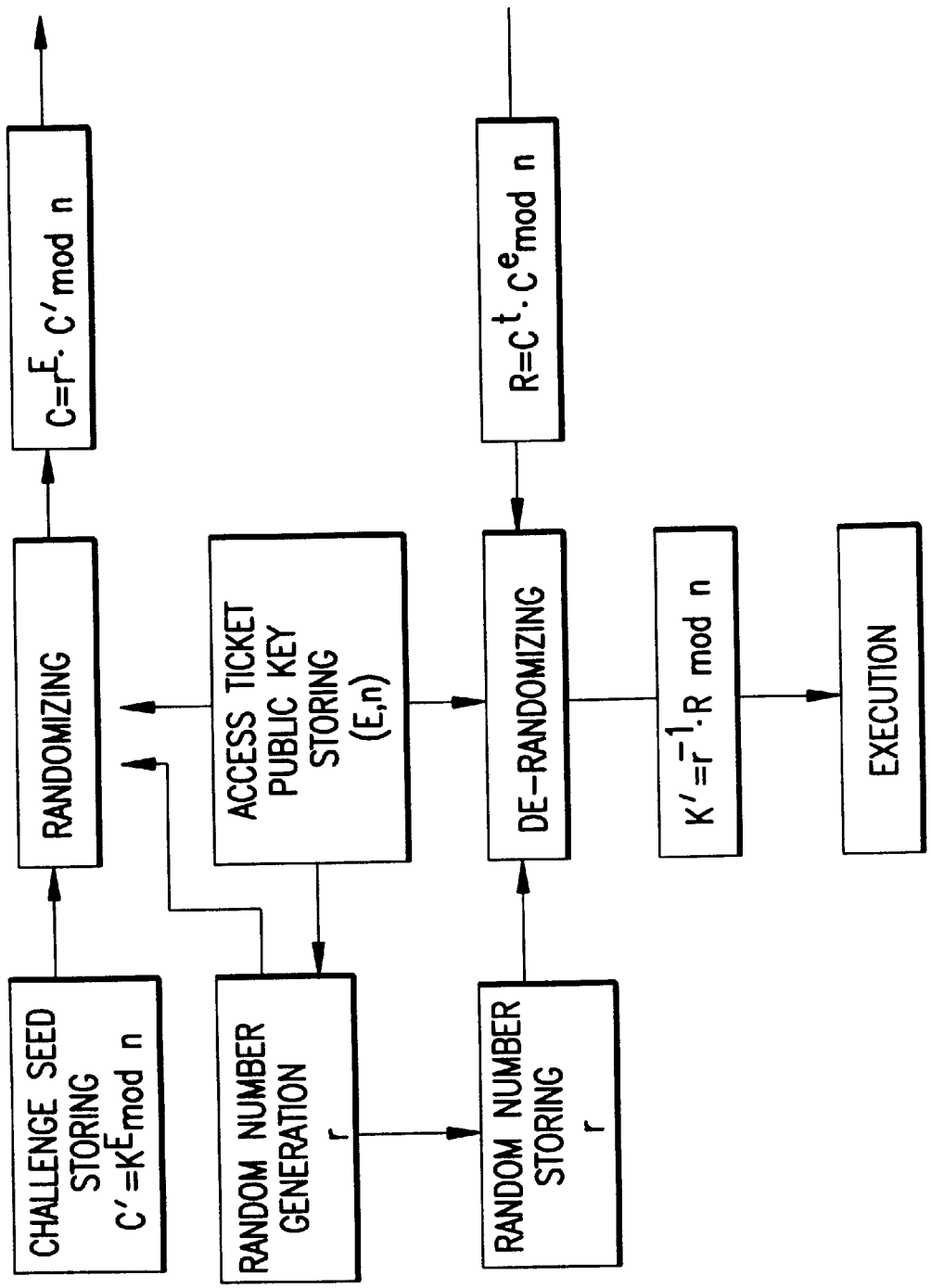
FIG. 6 is a flow chart showing functions of means constituting the verification device of the second embodiment.

FIG. 5 depicts the constitution of devices of the second embodiment, and FIG. 6 depicts flow of data. A verification device 10 comprises the following means: an access ticket public key storing means 101; a random number generation means 102; a random number storing means 103; a response storing means 105; a randomizing means 121; a challenge seed storing means 122; a de-randomizing means 123; and an execution means 310. A proving device 11 comprises the following means: a challenging data storing means 111; a first calculation means 102; an access ticket storing means 113; a second calculation means 114; a user identifying information storing means 115; and a response generation means 116.

By the following numbered paragraphs, the function of the means constituting the devices will be described step by step.

1. The verification device 10 is invoked by a user.
2. The verification device 10 sends challenging data C and a modulus n to the challenging data storing means 111 of the proving device 11. The modulus n is stored in the access ticket public key storing means 101. On the other hand, challenging data C is generated by carrying out the following steps: the random number, generating means 102 generates a random integer r so that r and the modulus n are relatively prime (gcd (r, n)=1); the random integer r is stored in the random number storing means 103; the randomizing means 121 generates challenging data C according to the relation (10).

$$C = r^E C' \mod n \qquad (10)$$

The integer C' is stored in the challenge seed storing means 122, and satisfies the relation (11) for some data K.

$$C' = K^E \mod n \qquad (11)$$

The exponent E (access ticket public key) and the modulus n are both stored in the access ticket public key storing means 101. The verification device 10 retains encryption C' of K instead of K itself. In fact, C' is RSA encryption of K with a public key E and a modulus n. This has an advantage in the viewpoint of security: the data K crucial for authentication procedures never leaks from the verification device 10. The randomness of r also plays an important role: if r were identical to some secret constant, the challenging data C would be encryption of the data K up to a constant coefficient, and therefore the response which the proving device 11 generates would be K up to a constant coefficient; thus, constant r would allow replay attacks since communication between the verification device 10 and the proving device 11 would be always identical. In this embodiment, by/generating challenging data C so that it is dependent on a random number r (see the relation (10)), communication between the verification device 10 and the proving device 11 occurs with variation, and therefore attempts of replay attack become hopeless.

3. The first calculation means 112 of the proving device 11 calculates an intermediate result R' according to the relation (12).

$$R' = C^t \mod n \qquad (12)$$

In course of calculation, the means uses the access ticket t stored in the access ticket storing means 113.

4. The second calculation means 114 of the proving device 11 calculates a differential S according to the relation (13).

$$S = C^e \mod n \qquad (13)$$

In course of calculation, the means uses the user identifying information e stored in the user identifying information storing means 115.

5. Receiving the intermediate result R' and the differential S from the first calculation means 112 and the second calculation means 114, the response generation means 116 of the proving device calculates a response R according to the relation (14).

$$R = R'S \mod n \qquad (14)$$

6. The proving device 11 returns the generated response R to the response storing means 307 of the verification device 10.

7. The de-randomizing means 307 of the verification device 10 calculates K' according to the relation (15).

$$K' = r^{-1} R \mod n \qquad (15)$$

In course of calculation, the means uses the random number r stored in the random number storing means 103 and the response R stored in the response storing means 105. Note that the values K' and K are identical with each other, if and only if the proving device 11 calculated the response R based on a right pair of an access ticket t and a user identifying information e. Finally, the de-randomizing means 123 sends K' to the execution means 310, and the execution means 310 executes predefined procedures using this given K'. The execution means 310 is designed so that it works properly only when K' is identical with K; otherwise it fails to work.

The following paragraphs describes several examples of implementation of the execution means 310.

Figure 7:
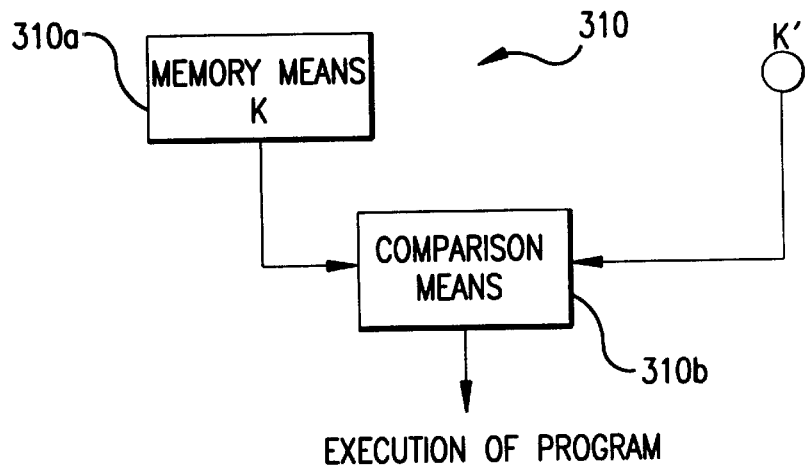
FIG. 7 is a block diagram showing a constitutional example of execution means of the verification means of the second embodiment.
Figure 8:
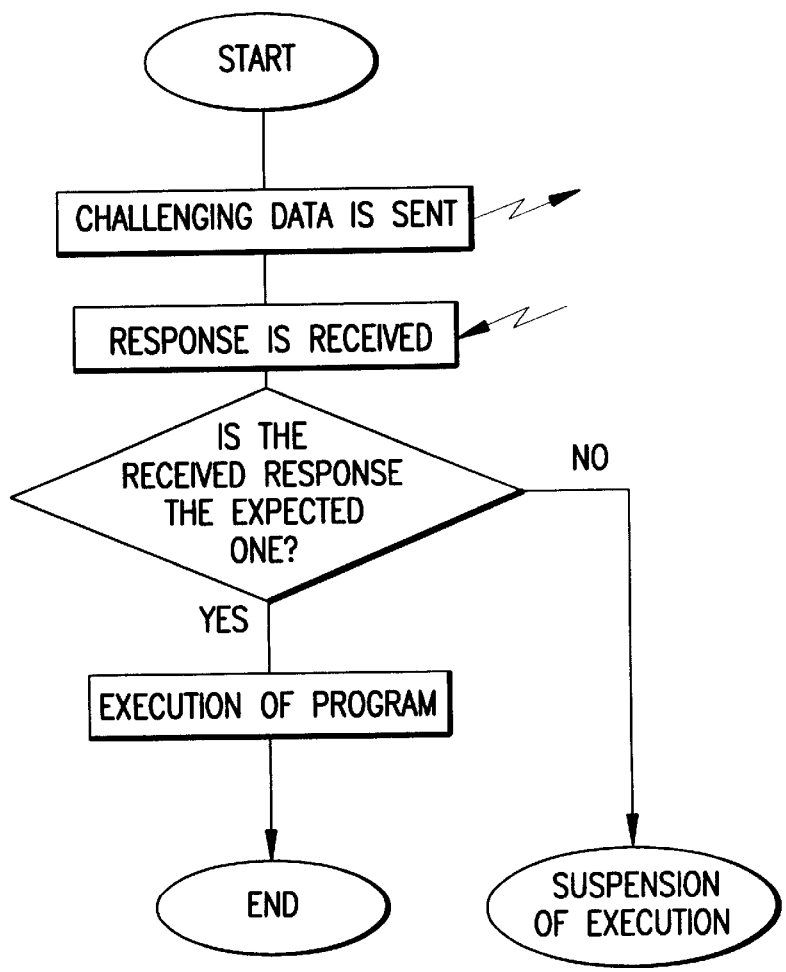
FIG. 8 is a flow chart showing functions of the constitutional example of the execution means shown in FIG. 7.

1. FIG. 7 depicts a first example. A memory means 310a of the execution means 310 retains the data K. Receiving K' from the de-randomizing means 123, a comparison means 310b directly examines the equality K=K'. If the equality does not hold, the execution means 310 suspends its performance immediately. Otherwise, the execution means 310 continues its performance and provides users with utilities. This example includes the disadvantage caused from the fact that the data K critical for authentication procedures appears as it is in the device: when a computer program to be installed and executed on a user's PC or workstation is implemented on the execution means 310, it is not impossible for a user to find out the value K by analyzing the code of the application program. The value K is crucial, because, if once the user knows the value of K, and further if he/she can predict random number sequences to be generated by the random number generation means 102, he/she can construct a device simulating the proving device 10 without any of an access ticket and a user identifying information e. In other words, anybody could pass the authentication check by the verification device 10 with this simulator, whether he/she is authorized or not.

Figure 9:
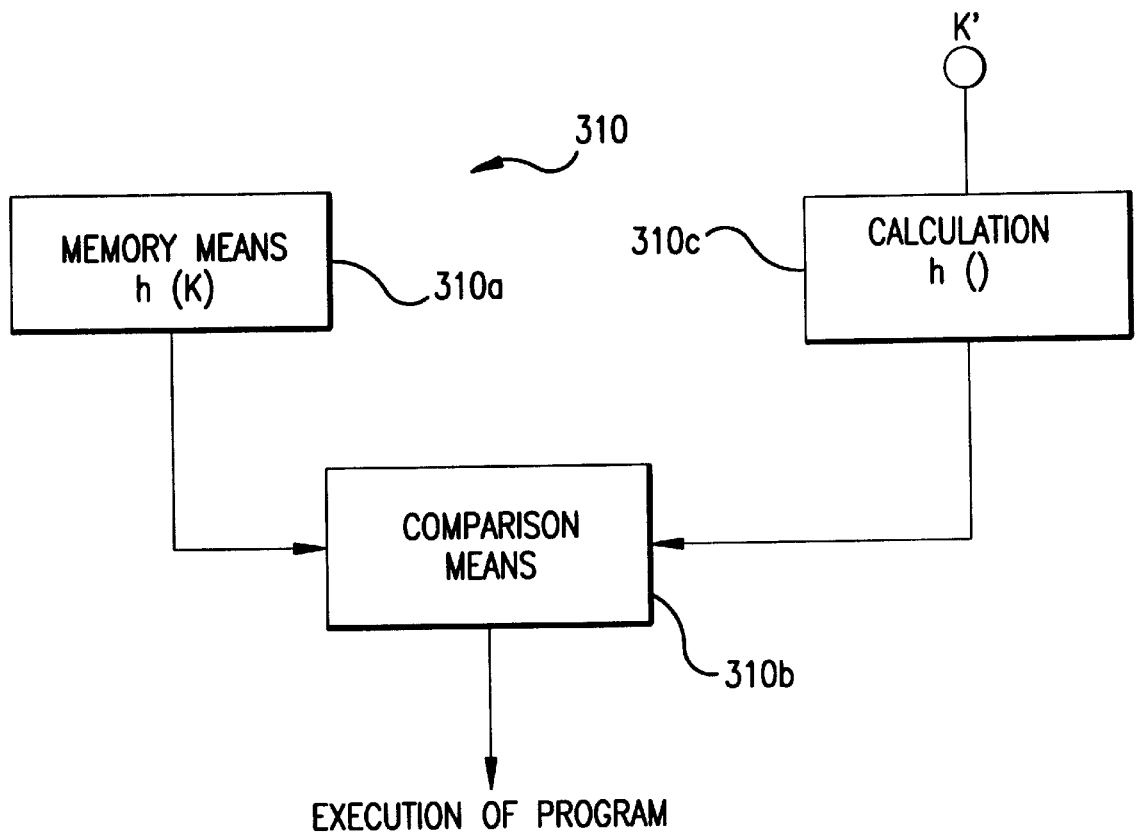
FIG. 9 is a block diagram showing a second constitutional example of execution means of the verification means of the second embodiment.
Figure 10:
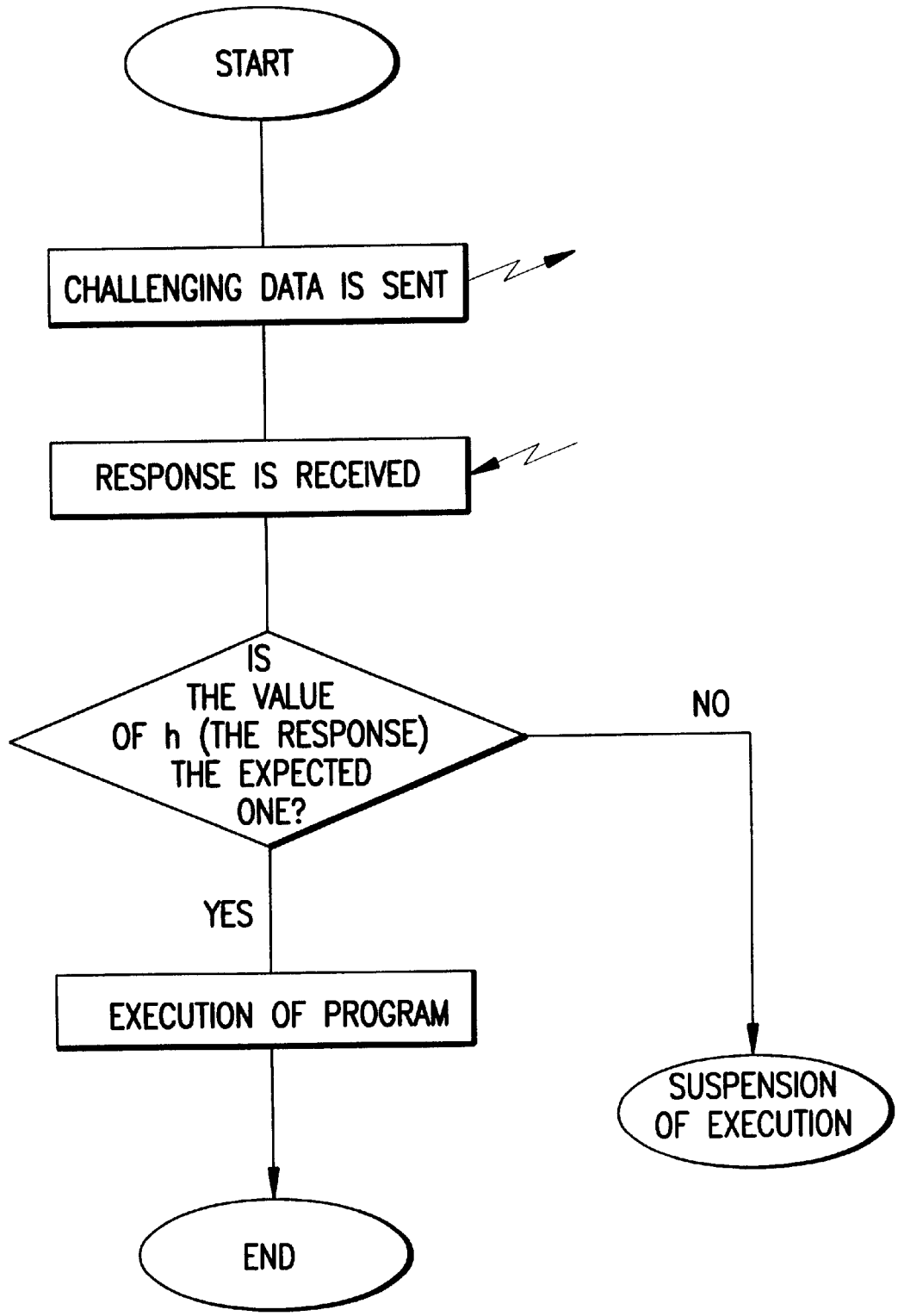
FIG. 10 is a flow chart showing functions of the constitutional example of the execution means shown in FIG. 9.

2. FIG. 9 depicts a second example. In this example, a memory means 310a retains h(K), instead of K, which is a value obtained by applying a one-way hash function h to K. A significant property of one-way hash functions is that it is computationally impossible to calculate x satisfying y=h(x) given y. Receiving K' from a de-randomizing means 123, a hashing means 310c calculates h(K') which is the result of applying the one-way hash function h to K'. Then, the comparison means 310b examines the identity of this h(K') and the value stored in the memory means 310a (=h(K)). Compared with the first example, this example is safer since there is no effective means to find out the critical data K: even though a user succeeded in analyzing the code of the program constituting the execution means 310, he/she couldn't find out any more than the value of h(K); due to the property of one-way hash functions, it is computationally impossible to calculate K given h(K). However, when the execution means 310 is implemented as a computer program, the comparison means 310b may be represented as an if-clause. If the verification device is further assumed to be executed on a user's PC or workstation, a user may have a chance to modify the code so that the if-clause shall be always skipped. Therefore, the implementation of the this example is not safe enough, in particular, if the execution means 310 is implemented as a computer program to be executed on a user's PC or workstation.

Figure 11:
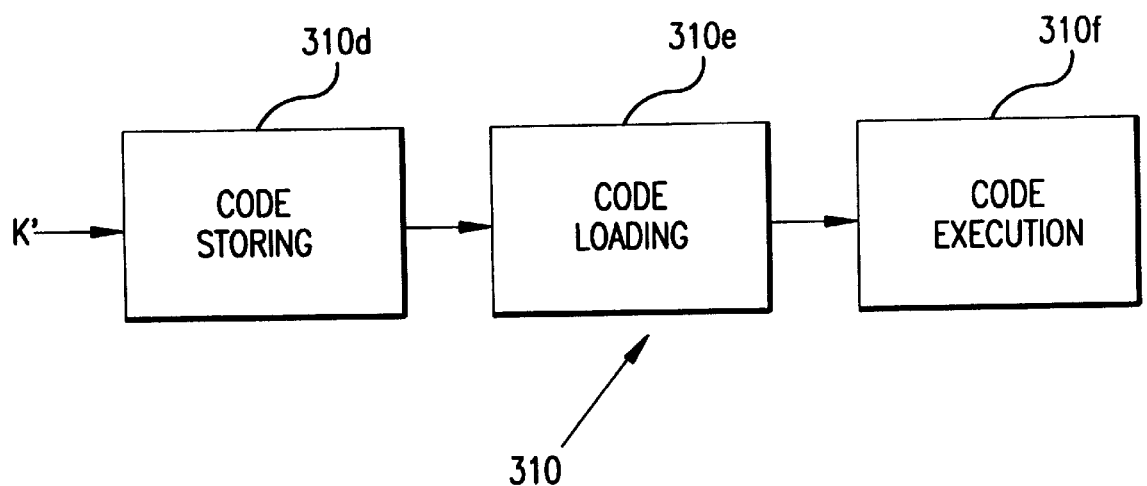
FIG. 11 is a block diagram showing a third constitutional example of execution means of the verification means of the second embodiment.
Figure 12:
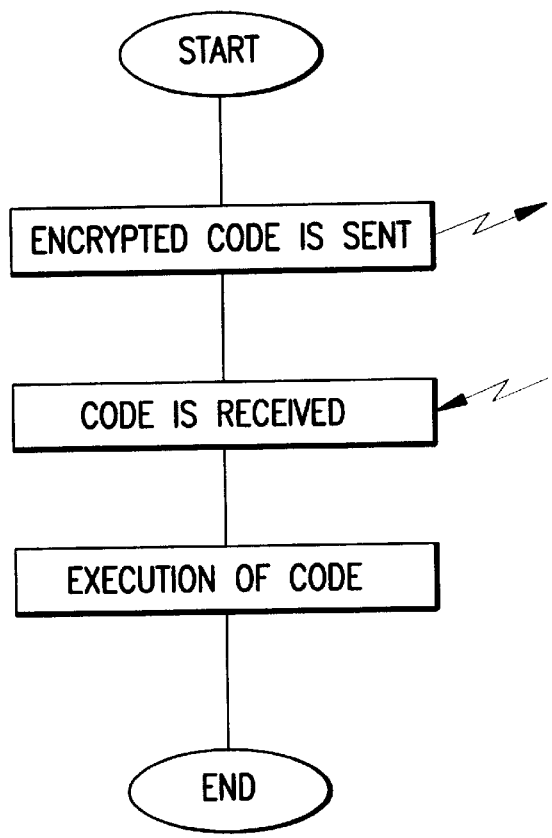
FIG. 12 is a flow chart showing functions of the constitutional example of the execution means shown in FIG. 11.

3. FIG. 11 depicts a third example. This time, protection is applied such that execution of the program of the execution means 310 becomes impossible by encrypting a portion or the whole of the code of the program. The encrypted code is stored in the challenge seed storing means 122 as a seed C' for challenging data C. More precisely, the crucial data K is program code to be encrypted, and C' is RSA encryption of the code K with a public key E and a modulus n ($C=K^E$ mod n). Both E and n are the values stored in the access ticket public key storing means 101. The execution means 310 includes a code storing means 310d, a code loading means 310e and a code execution means 310f. The code loading means 310e feeds K', which the code storing means 310d received from the de-randomizing means 123, to the code execution means 310f. Only when K' is identical with K, the code fed to the code execution means 310f is meaningful as a part of the program of the execution means 310. In the following, a more detailed description of the composition is provided. Consider the case where the execution means 310 is implemented as a computer program executed on a user's PC or workstation. The code storing means 310d is a specified region within a memory of a user's PC. The code execution means 310f comprises the CPU and OS of the PC. The CPU and OS, cooperating with each other, fetch instructions form a certain predefined region within the memory space (called program region), and executes those instructions one by one. Generally speaking, a meaningful chunk of instructions is called a program, and a program is located within the program region. The entity of the code loading means 310e is a part of the program constituting the execution means 310, and it is to be executed at first when the execution means 310 is invoked. When invoked, the code loading means 310e orders the code execution means 310f to copy the content stored in the code storing means 310d onto a specified area within the program region, and then orders the code execution means 310f to execute the copied sequence of instructions by issuing a JMP command, for example. Thus, since a part or the whole of the code of the program of the execution means 310 is encrypted, and further since it is decrypted temporarily only when the verification device 10 and the proving device 11 cooperate with each other properly, the execution means 310 is much safer than in the cases of the preceding two examples: even though a user succeeded in analyzing the program, he/she couldn't obtain the missing code K at all; modifying the code of the program without the knowledge about K is definitely no use.

Figure 13:
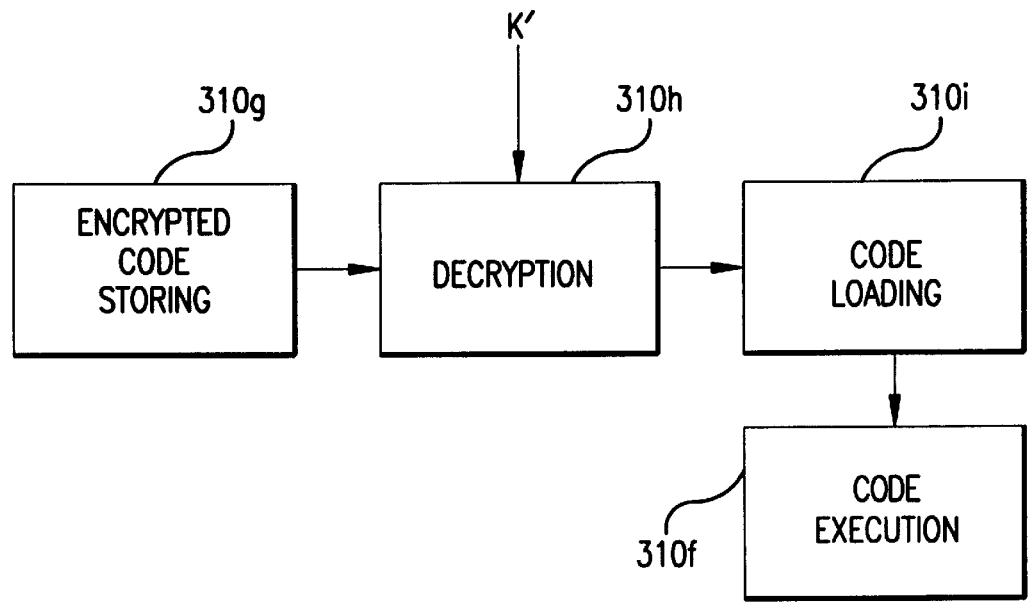
FIG. 13 is a block diagram showing a fourth constitutional example of execution means of the verification means of the second embodiment.
Figure 14:
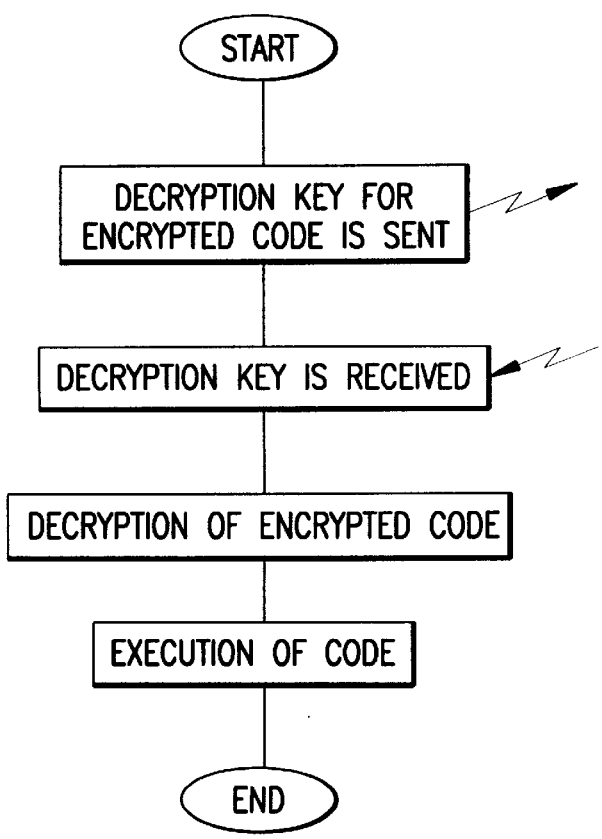
FIG. 14 is a flow chart showing functions of the constitutional example of the execution means shown in FIG. 13.

4. FIG. 13 depicts a fourth example. This example is substantially the same as the third example except that K is the encryption key used in encrypting code of the program constituting the execution means 310, while K is the code itself in the previous example. Since the code to be encrypted may be of large size, according to the composition of the third example, the size of K (namely, that of C' and C) may be large enough to make the performance of the verification device 10 and the proving device 11 worse. In contrast, according to the composition of the fourth example, the size of K (namely, that of C') remains unchanged irrespective of the size of the program code to be encrypted: the size of K is determined by the cipher algorithm to be used; if DES (Data Encryption Standard) is used, K is always 64 (56) bits long even when the size of the code to be encrypted is measured by Mbyte. The execution means 310 comprises an encrypted code storing means 310g, a decryption means 310h, a code loading means 310l, and code execution means 310f. Receiving the data K' from the de-randomizing means 123, the decryption means 310h decrypts the content stored in the encrypted code storing means 310g. In the process of decryption, K' is used as a decryption key. The code loading means 310l loads the output of the decryption means 310h, which is decrypted code if K' is identical with K, onto a specified area within the program region, and then orders the execution means 310f to execute the loaded code.

Third Embodiment

In a third embodiment, the definition of an access ticket is given as the relation (16).

$$t=D+F(n, e) \tag{16}$$

The following bulleted paragraphs illustrate the symbols appearing in the relation (16).

An integer n is an RSA modulus, hence, a product of two very large prime numbers p and q (n=pq).

$\phi(n)$ denotes the Euler number of n, hence, a product of two integers p−1 and q−1 ($\phi(n)=(p-1)(q-1)$).

A user identifying information e is an integer allocated to each user. The user identifying information e is unique to each user: a different user identifying information is allocated to a different user.

An access-ticket secret key D is the private key of an RSA public key pair. Since the assumed modulus is n, D satisfies the relation (17).

$$\gcd(D, \phi(n))=1 \tag{17}$$

In the above, gcd(x, y) denotes the greatest common divisor of two integers x arid y. The existence of an integer E satisfying the relation (18), which is called an access-ticket public key, is derived form the relation 17.

$$ED \bmod \phi(n)=1 \tag{18}$$

A two variable function F(x, y) is an arbitrary collision-free function. Practically, a collision-free function may be constructed using a one-way hash function h as the relation (19).

$$F(x, y)=h(x|y) \tag{19}$$

Figure 15:
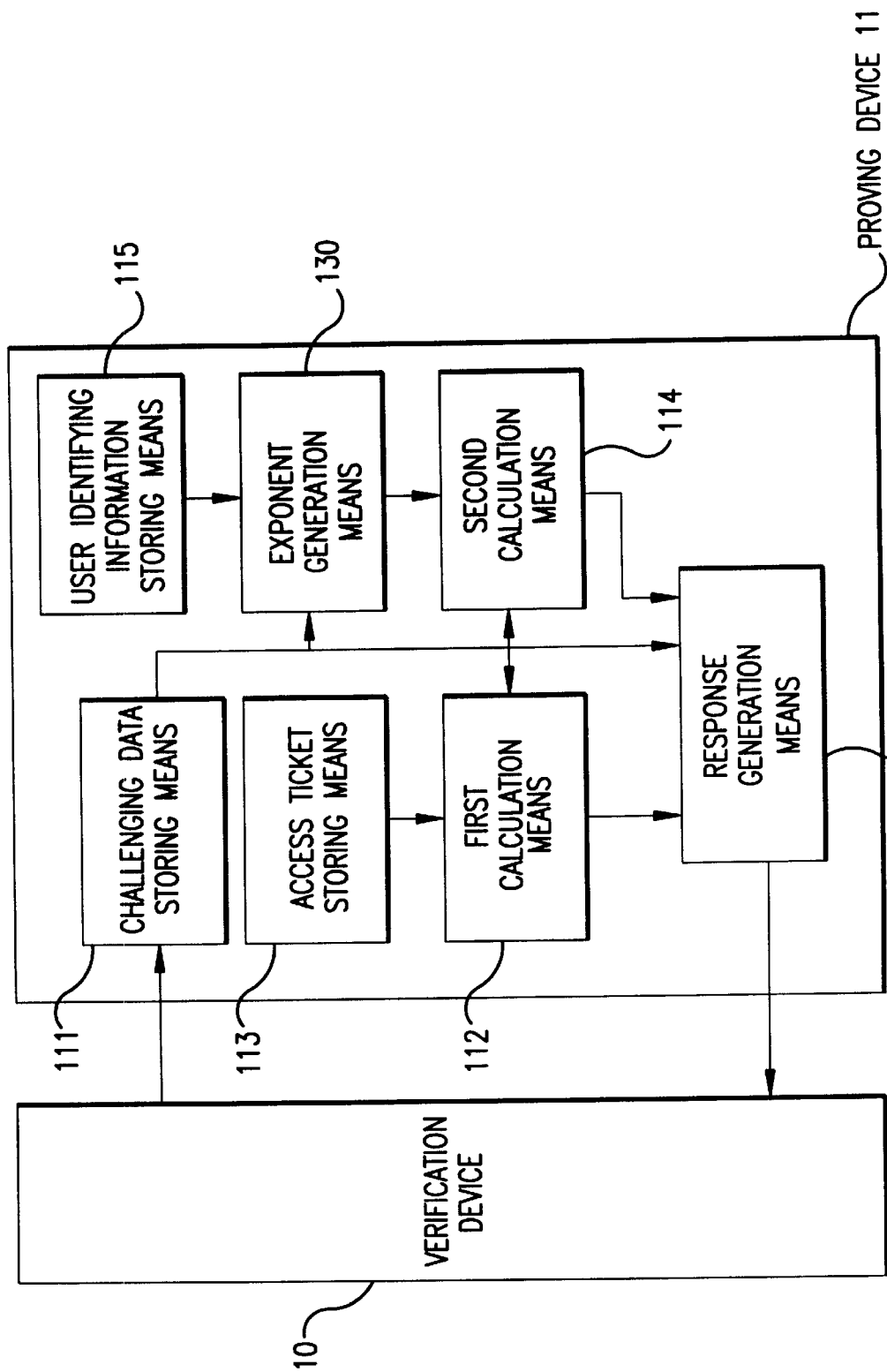
FIG. 15 is a block diagram showing the constitution of a proving device of a third embodiment of the device for authenticating user's access rights to resources according to the present invention.
Figure 16:
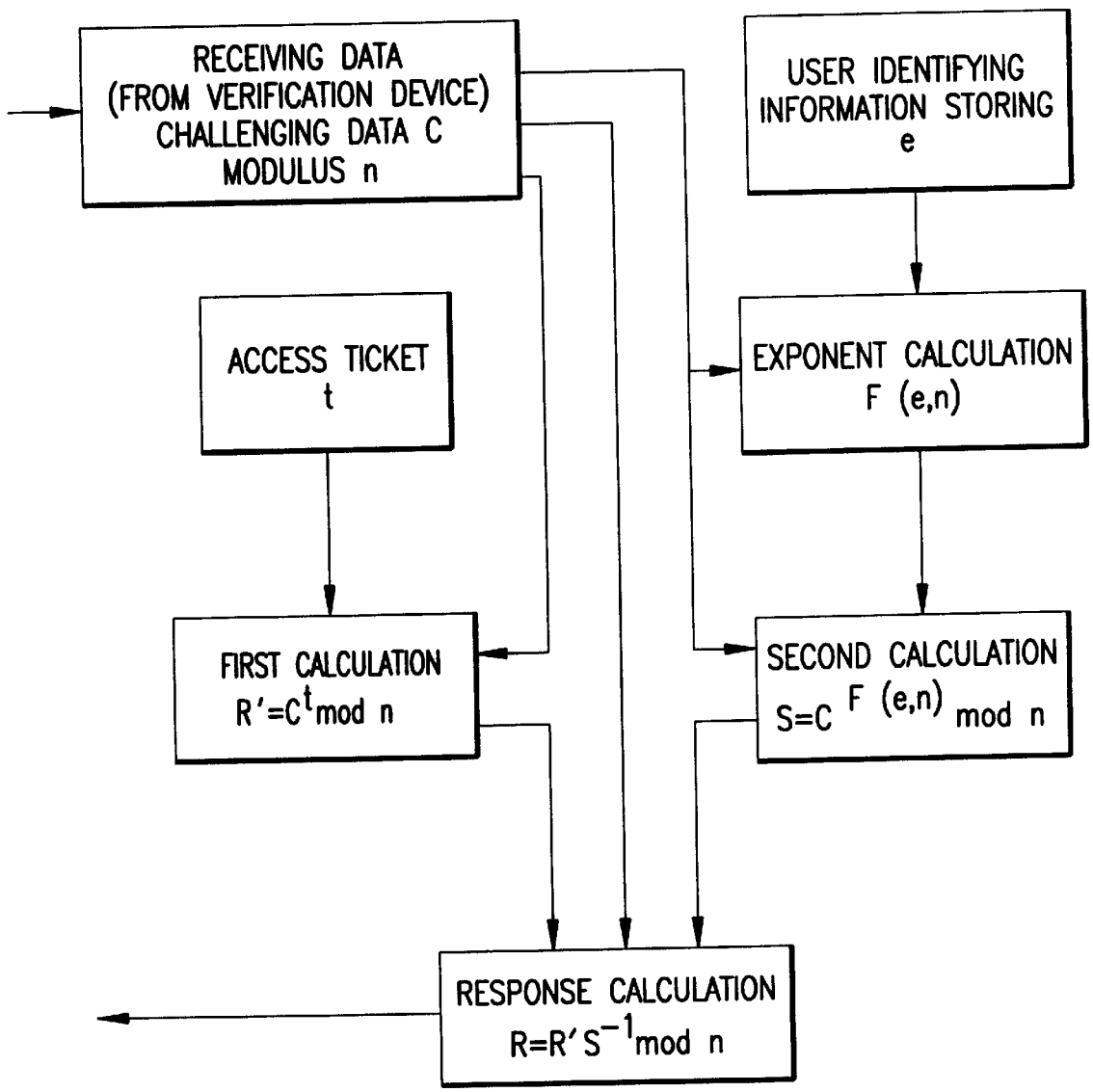
FIG. 16 is a flow chart showing functions of means constituting the proving device of the third embodiment.

FIGS. 15 and 16 are for depicting this embodiment: FIG. 15 depicts the constitution of the devices of this embodiment; FIG. 16 depicts flow of data. In FIG. 15, a proving device 11 comprises a challenging data storing means 111, a first calculation means 112, an access ticket storing means 113, a second calculation means 114, a user identifying information storing means 115, a response generation means 116, and an exponent generation means 130. A verification device 10 in this embodiment may be identical with that in any of the first embodiment (shown in FIG. 3) or the second embodiment (shown in FIG. 5).

By the following numbered paragraphs, the function of the means constituting the devices will be described step by step.

1. The verification device 10 is invoked by a user.
2. The verification device 10 sends challenging data C and a modulus n to the challenging data storing means 111 of the proving device 11. The modulus n is stored in the access ticket public key storing means 101, and the challenging data C is generated in one of the manners defined in the first embodiment or the second embodiment: C is identical with either $r^E$ mod n or $r^E C'$ mod n.
3. The first calculation means 112 of the proving device 11 calculates an intermediate result R' according to the relation (20). An access ticket t to be used is stored in the access ticket storing means 113.

$$R' = C^t \bmod n \qquad (20)$$

4. The exponent generation means 130 calculates F(n, e) by applying the collision-free function F to the modulus n, stored in the challenging data storing means 111, and the user identifying information e, stored in the user identifying information storing means 115.

$$F(n, e) \qquad (21)$$

5. Receiving the result from the exponent generation means 130, the second calculation means 114 of the proving device 11 calculates a differential S according to the relation (22).

$$S = C^{F(n,\ e)} \bmod n \qquad (22)$$

6. Receiving R' and S from the first calculation means 112 and the second calculation means 114, the response generation means 116 of the proving device calculates a response R according to the relation (23).

$$R = R'S^{-1} \bmod n \qquad (23)$$

In the relation (23), $S^{-1}$ denotes the reciprocal of S under the modulus n. Hence, S and $S^{-1}$ satisfy the relation (24).

$$SS^{-1} \bmod n = 1 \qquad (1)$$

7. The proving device 11 returns the generated response R to the response storing means 105 of the verification device 10.
8. The verification device 10 examines the response received from the proving device 11.

Fourth Embodiment

In a fourth embodiment, a proving device 11 comprises a computer program executed on a user's PC or workstation, a smart card or PC card (PCMCIA card) attachable to the user's PC or workstation, and a program executed on this smart card or PC card.

As is obvious from the explanation of the former three embodiments, a user identifying information e, stored in a user identifying information storing means 115, must be kept secret to others. Furthermore, observing process of execution of a second calculation means 114, which needs e as an input to itself, may lead to leak of e. The same situation applies to an exponent generation means 130. Consequently, in practical use, the user identifying information storing means 115, the second calculation means 114 and the exponent generation means 130 should be protected by some means against attempts to pry out some crucial secret out of them.

One solution is confining the crucial part of the proving device 11 within hardware equipped with function to prevent its inside from being observed or tampered with by unauthorized means. Generally, such hardware is called tamper-resistant hardware.

In creating the tamper-resistant hardware, it is possible to use the technology disclosed in Japanese Laid-open Patent Publication 5-75135, Japanese Laid-open Patent Publication 5-68727 or Japanese Laid-Open Patent Publication 3-100753, for example. In Japanese Laid-open Patent Publication 5-75135, an enclosure composed of a plurality of cards having multi-layered conductive patterns is provided surrounding an information memory medium. Memory information is destroyed when the conductive pattern which is detected differs from an expected pattern.

In Japanese Laid-Open Patent Publication 5-68727, a detection circuit composed of an integration circuit or the like is provided surrounding an information memory medium in addition to a conductive winding being formed, and through this, when there is infiltration to the electronic circuit region, fluctuations in electromagnetic energy are detected and memory information is destroyed.

In Japanese Laid-Open Patent Publication 3-100753, an optical detector is provided within hardware, and the optical detector detects external light which enters when a force is applied which destroys the hardware or punctures the hardware, and a memory destruction device resets memory information.

Further, choosing tamper-resistant hardware with portability such as a smart card or PC card may provide users with additional merits. Among information dealt with by a proving device 11, only an access ticket and a user identifying information are unique to an individual user. Hence, for example, it may be useful to confine a user identifying information storing means 115, access ticket storing means 113, a second calculation means 114 and exponent generation means 130 within a smart card or PC card, and implement the rest of the proving device 10 as a program to be executed on an arbitrary PC or workstation: a user can use an arbitrary PC or workstation, assuming that the program is installed on it, as his/her proving device only by inserting his/her own smart card or PC card into the computer.

Figure 17:
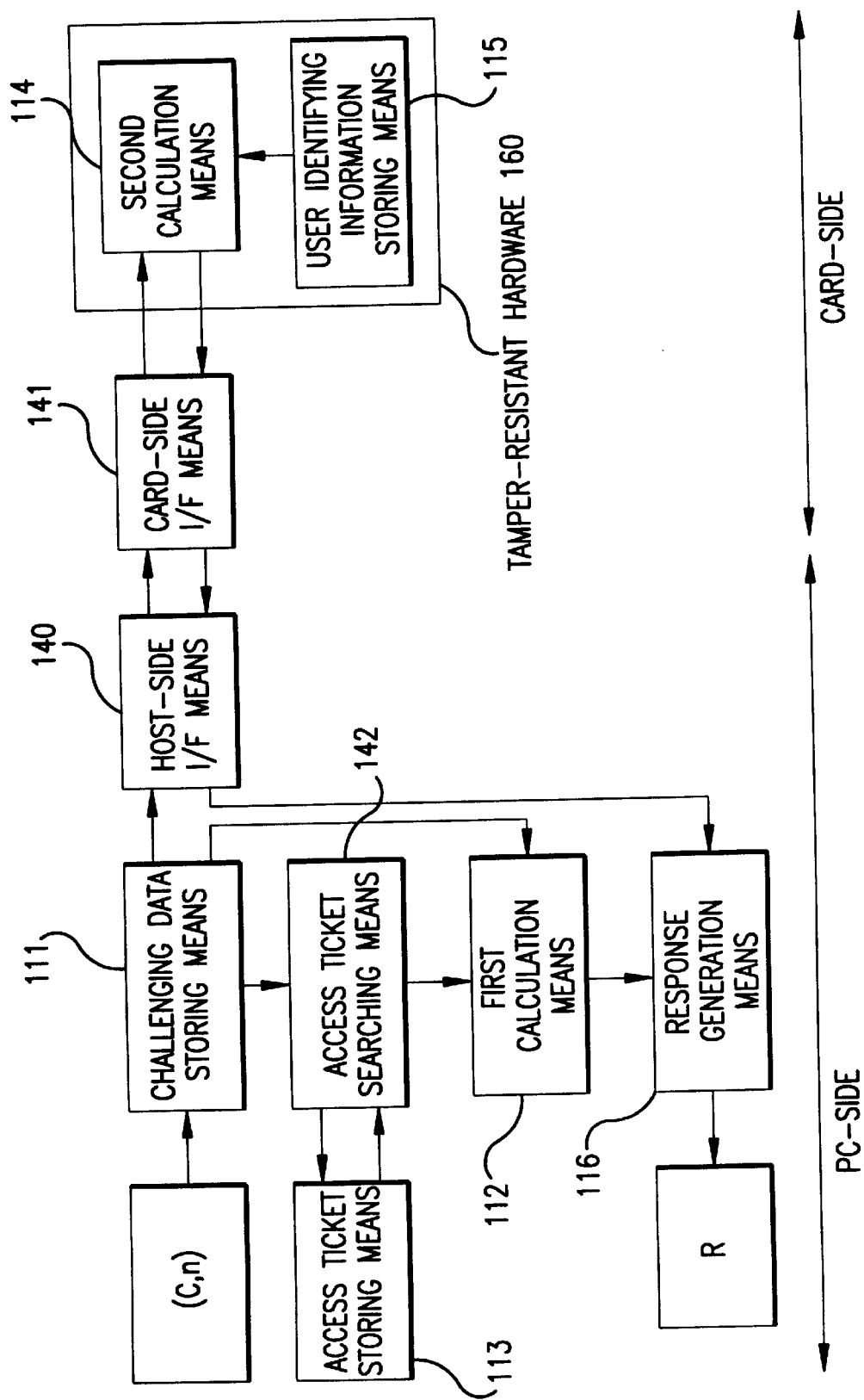
FIG. 17 is a block diagram showing a constitutional example of a fourth embodiment of the device for authenticating user's access rights to resources according to the present invention.

FIG. 17 depicts constitution of a proving device 11 of the first and second embodiments when a user identifying information storing means 115 and a second calculation means 115 are confined within a smart card.

Figure 18:
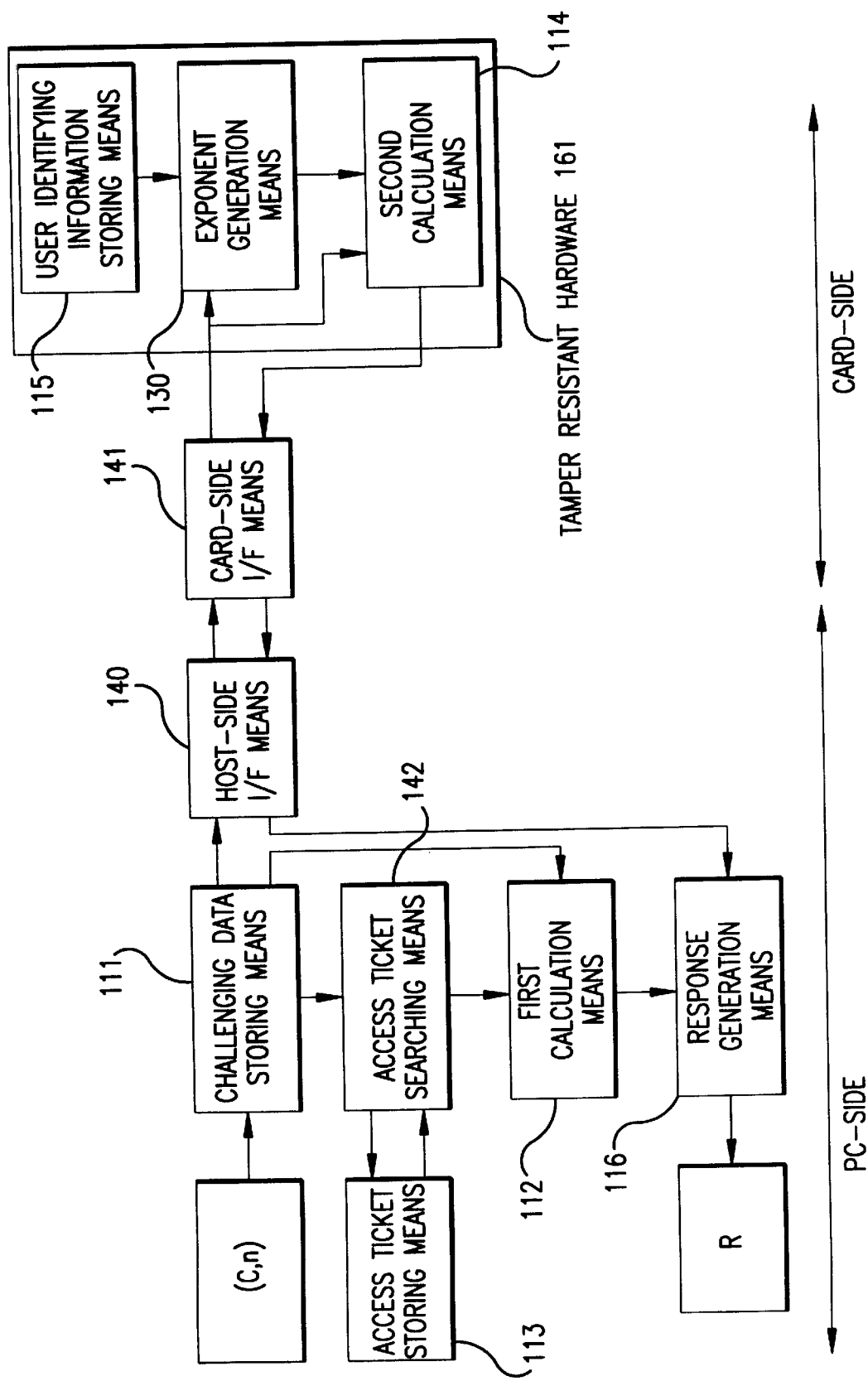
FIG. 18 is a block diagram showing another constitutional example of the fourth embodiment.
Figure 19:
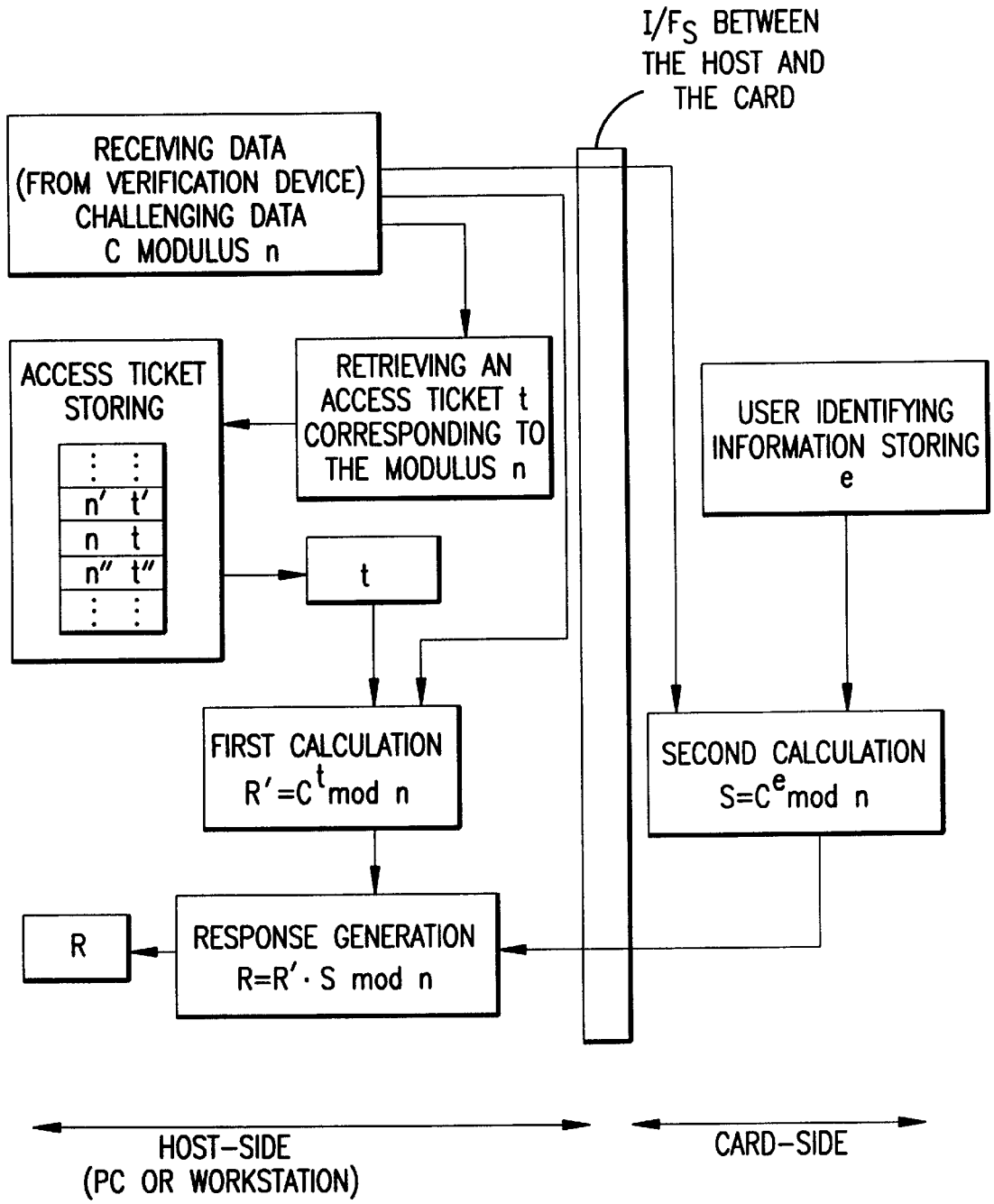
FIG. 19 is a flow chart showing functions of means of the constitutional example shown in FIG. 17.

FIG. 18 depicts constitution of a proving device 11 of the third embodiment when a exponent generation means 130 in addition to a user identifying information storing means 115 and a second calculation means 115 is confined within a smart card.

For both FIGS. 17 and 18, a card-side I/F means 141 within a smart card is an interface to a host computer for communication between a host computer and the smart card. More practically, the card-side I/F means 141 comprises buffer memory and a communication program.

A host-side I/F means 140, which is a part of a host computer, is the counter part of the card-side I/F means 141. Both I/F means, cooperating with each other, transfer messages from the host computer to the smart card, and vice versa.

The following numbered paragraphs describe the function of the means constituting the devices.

1. The verification device 10 is invoked by a user.
2. The verification device 10 sends challenging data C and a modulus n stored in the access ticket public key storing means 101 to the challenging data storing means 111 of the proving device 11.
3. The host-side I/F means 140 of the proving device 10 sends the challenging data C and the modulus n to the card-side I/F means 141 within the smart card.
4. The access ticket searching means 142 retrieves an access ticket t corresponding to the modulus n that is stored in the challenging data storing means 111. As shown before, in any of the former three embodiments, the definition of an access ticket t involves a modulus n (t=D−e+ωφ(n) or t=D+F(n, e)). In the access ticket storing means 113, zero or more access ticket are stored, and each access ticket is indexed with the modulus that was used in generating the access ticket.
5. The first calculation means 112 of the proving device 11 calculates an intermediate result R' according to the relation (25). An access ticket t is stored in the access ticket storing means 113.

$$R'=C^t \bmod n \tag{25}$$

6. The host-side I/F means 140 issues a requirement for a differential S to the card-side I/F means 141. A response which the host-side I/F means 140 receives is a differential S of one of the following forms: if the access ticket t and the means within the smart card were implemented in the manner of the first and second embodiments, the differential S satisfies the relation (26); if the access ticket t and the means within the smart card were implemented in the manner of the third embodiment, the differential S satisfies the relation (27).

$$S=C^e \bmod n \tag{26}$$

$$S=C^{F(n,\ e)} \bmod n \tag{27}$$

7. The response generation means 116 of the proving device 11 calculates a response R according to either the relation (28) or (29): if the access ticket t and the means within the smart card were implemented in the manner of the first and second embodiments, the relation (28) shall be applied; if the access ticket t and the means within the smart card were implemented in the manner of the third embodiment, the relation (29) shall be applied.

$$R=R'S \bmod n \tag{28}$$

$$R=R'S^{-1} \bmod n \tag{29}$$

8. The proving device 11 returns the generated response R to the response storing means 307 of the verification device 10.

In this embodiment, it is possible to calculate the intermediate result R' and the differential S concurrently, because the former is calculated within the host computer and the latter is within the smart card. Obviously, this concurrent calculation reduces the total time which the proving device 11 needs for calculating a response to a received challenging data.

Further, in this embodiment, the access ticket storing means 113 may retain more than one access tickets, and the access ticket searching means 142 retrieves an appropriate access ticket using a modulus issued by the verification device 10 as a key for retrieval. Basically, different verification device, which may be embedded within a different application program or server program, should assume a different modulus. Therefore, a user who want to access to more than one application programs or server programs is obliged to have a number of access tickets.

The stated function of the access ticket searching means 142 would release a user from paraphernalia of selecting a correct access ticket by himself.

Fifth Embodiment

In a fifth embodiment, the Pohlig-Hellman asymmetric key cryptography is used instead of the RSA public key cryptography.

In this embodiment, the definition of an access ticket t is given as the relation (30).

$$t=D+F(p,\ e) \tag{30}$$

The following bulleted paragraphs illustrate the symbols appearing in the relation (30).

- An integer p is a very large prime number.
- A user identifying information e is an integer allocated to each user. The user identifying information e is unique to an individual user: a different user identifying information is allocated to a different user.
- An access ticket secret key D is one component of a Pohlig-Hellman asymmetric key pair. Since the assumed modulus is p, D satisfies the elation (31).

$$\gcd(D,\ p-1)=1 \tag{31}$$

- In the above, gcd(x, y) denotes the greatest common divisor of two integers x and y. The existence of an integer E satisfying the relation (32), which is called an access-ticket public key, is derived from the relation (31).

$$ED \bmod p-1=1 \tag{1}$$

- A two variable function F(x, y) is an arbitrary collision-free function. Practically, a collision-free function may be constructed using a one-way hash function h as the relation (33).

$$F(x,\ y)=h(x|y) \tag{33}$$

Figure 20:
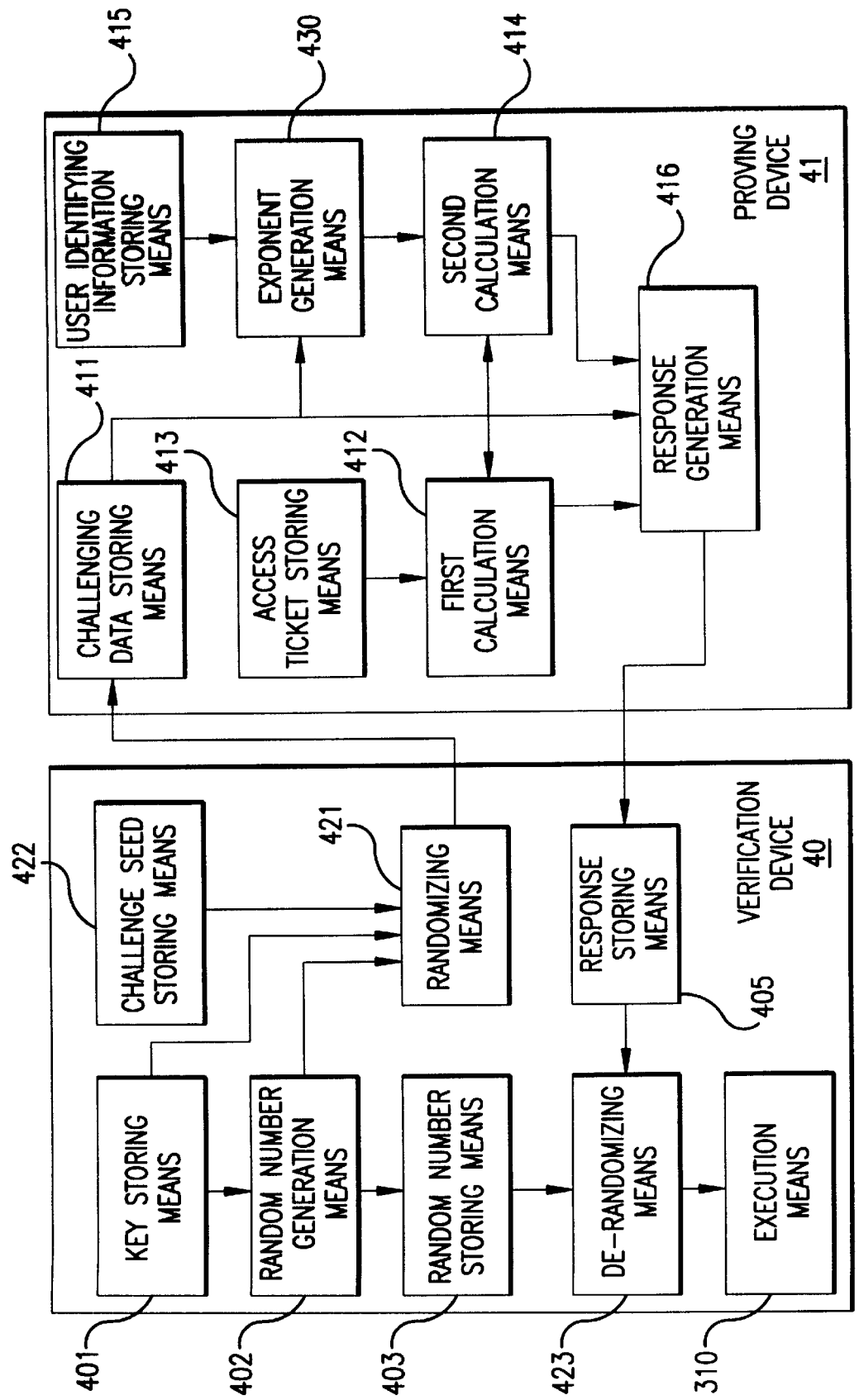
FIG. 20 is a block diagram showing the constitution of a fifth embodiment of the device for authenticating user's access rights to resources according to the present invention.
Figure 21:
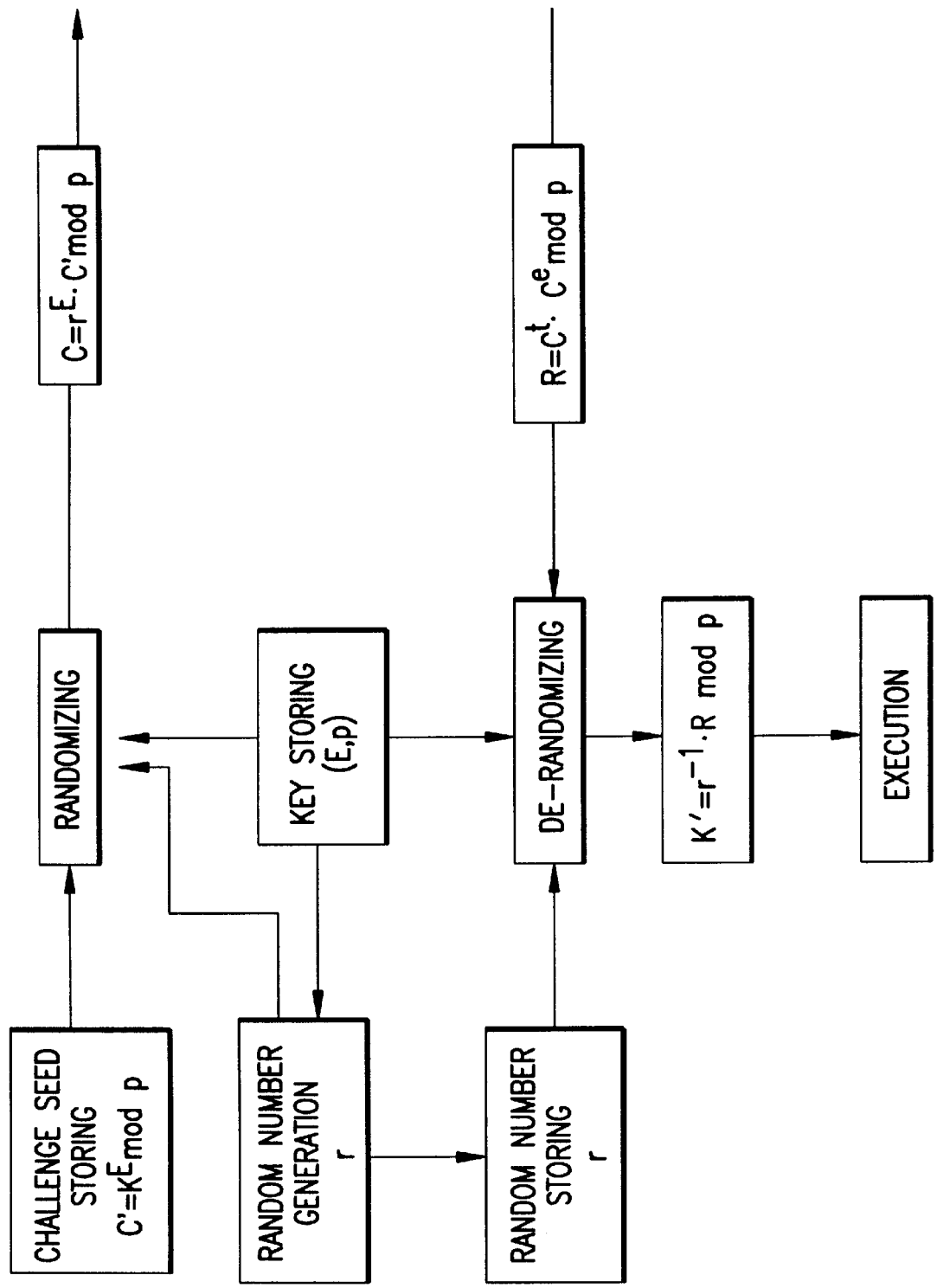
FIG. 21 is a flow chart showing functions of means constituting a verification device of the fifth embodiment.

FIGS. 20 and 21 are for depicting this embodiment: FIG. 20 depicts the constitution of the devices of this embodiment; FIG. 21 depicts flow of data. In FIG. 20, a proving device 41 comprises the following means: a challenging data storing means 411; a first calculation means 412; an access ticket storing means 413; a second calculation means 414; a user identifying information storing means 415; a response generation means 416; and an exponent generation means 430. On the other hand, a verification device 40 comprises the following means: a key storing means 401; a random number generation means 402; a random number storing means 403; a response storing means 405; a randomizing means 421; a challenging seed storing means 422; a de-randomizing means 423; and an execution means 310.

By the following numbered paragraphs, the function of the means constituting the devices will be described step by step.

1. The verification device 40 is invoked by a user.
2. The verification device 40 sends challenging data C and a modulus p to the challenging data storing means 411 of the proving device 41. The modulus p is stored in the key storing means 401. In this embodiment, the challenging data C is assumed to be generated in a manner similar to that in the second embodiment. However, it is easy to construct another embodiment such that challenging data C is generated in a manner similar to that in the first embodiment. The challenging data C in this embodiment is generated by carrying out the following steps: the random number generating means 402 generates a random integer r so that r and the modulus p are relatively prime (gcd(r, p)=1); the random integer r is stored in the random number storing means 403; and the randomizing means 121 generates challenging data C according to the relation (34).

$$C = r^E C' \mod p \quad (34)$$

The integer C' is stored in the challenge seed storing means 422, and satisfies the relation (35) for some data K.

$$C' = K^E \mod p \quad (35)$$

The exponent E (access ticket public key) and the modulus p are both stored in the key storing means 401.

3. The first calculation means 412 of the proving device 41 calculates an intermediate result R' according to the relation 36. An access ticket t to be used is stored in the access ticket storing means 113.

$$R' = C^t \mod p \quad (36)$$

4. The exponent generation means 430 calculates F(p, e) by applying the collision-free function F to the modulus p, stored in the challenging data storing means 111, and the user identifying information e, stored in the user identifying information storing means 415.

$$F(p, e) \quad (37)$$

5. Receiving the result from the exponent generation means 430, the second calculation means 414 of the proving device 41 calculates a differential S according to the relation (38).

$$S = C^{F(p, e)} \mod p \quad (38)$$

6. Receiving R' and S from the first calculation means 412 and the second calculation means 414, the response generation means 416 of the proving device 41 calculates a response R according to the relation (39).

$$R = R'S^{-1} \mod p \quad (39)$$

In the relation (39), $S^{-1}$ denotes the reciprocal of S under the modulus p. Hence, S and $S^{-1}$ satisfy the relation (40).

$$SS^{-1} \mod p = 1 \quad (40)$$

7. The proving device 41 returns the generated response R to the response storing means 405 of the verification device 40.

8. The de-randomizing means 423 of the verification device 40 calculates K' according to the relation (41).

$$K' = r^{-1} R \mod p \quad (41)$$

In course of calculation, the means uses the random number r stored in the random number storing means 403 and the response R stored in the response storing means 405.

Sixth Embodiment

A sixth embodiment is substantially similar to the third embodiment except that the ElGamal public key cryptography is used this time instead of the RSA public key cryptography.

In this embodiment, the definition of an access ticket t is given as the relation (42).

$$t = X + F(p, e) \quad (42)$$

The following bulleted paragraphs illustrate the symbols appearing in the relation (42).

An integer p is a very large prime number.

A user identifying information e is an integer allocated to each user. The user identifying information is unique to an individual user: a different user identifying information is allocated to a different user.

Let (X, Y) be an arbitrary ElGamal asymmetric key pair assuming p is the modulus. Therefore the relation (43) is satisfied.

$$Y = G^X \mod p \quad (43)$$

In the relation (43), G denotes an integer representing a generator of the multiplicative group of the finite field of order p. Equivalently, G satisfies the relations (44) and (45).

$$G > 0 \quad (44)$$

$$\min \{x > 0 | G^x = 1 \mod p\} = p - 1 \quad (45)$$

X is called an access ticket secret key, while Y is called an access ticket public key.

A two variable function F(x, y) is an arbitrary collision-free function. Practically, a collision-free function may be constructed using a one-way hash function h as the relation (46).

$$F(x, y) = h(x|y) \quad (46)$$

Figure 22:
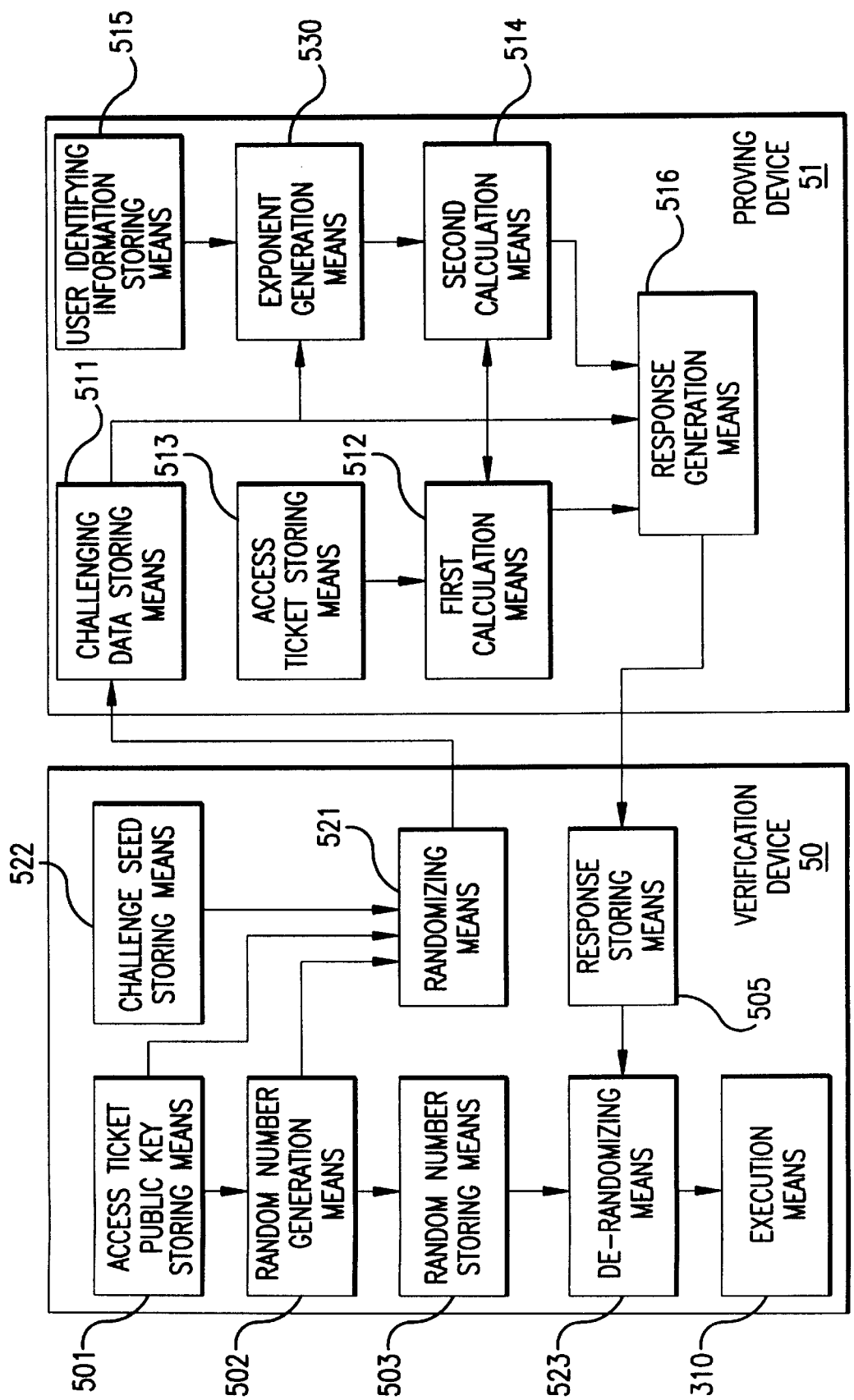
FIG. 22 is a block diagram showing the constitution of a sixth embodiment of the device for authenticating user's access rights to resources according to the present invention.
Figure 23:
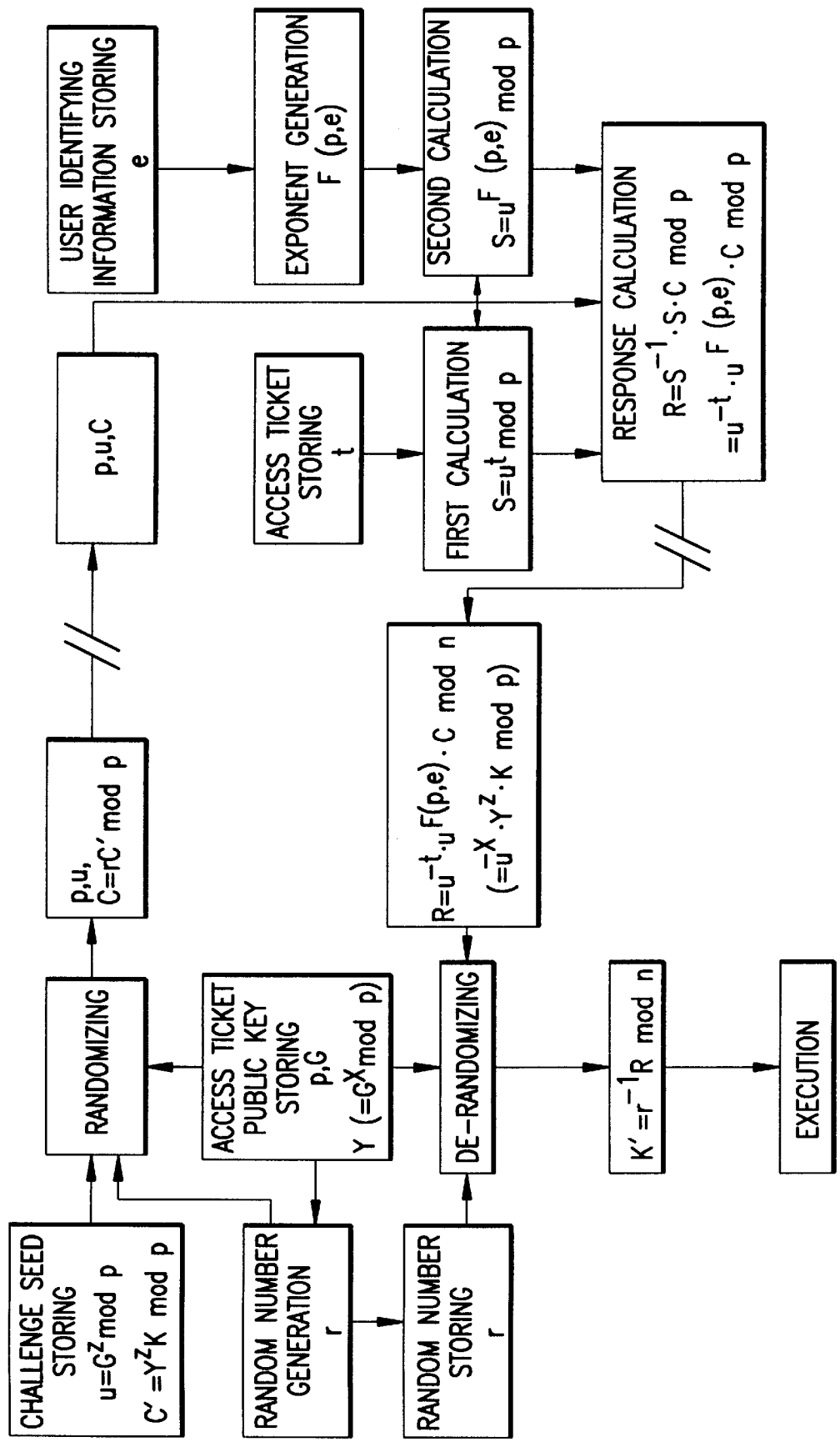
FIG. 23 is a flow chart showing functions of means constituting devices of the sixth embodiment.

FIGS. 22 and 23 are for depicting this embodiment: FIG. 22 depicts the constitution of the devices; of this embodiment; FIG. 23 depicts flow of data. In FIG. 22, a proving device 51 comprises the following means: a challenging data storing means 511; a first calculation means 512; an access ticket storing means 513; a second calculation means 514; a user identifying information storing means 515; a response generation means 516; and an exponent generation means 530. On the other hand, a verification device 50 comprises the following means: an access ticket public key storing means 501; a random number generation means 502; a random number storing means 503; a response storing means 505; a randomizing means 521; a challenge seed storing means 522; a de-randomizing means 523; and an execution means 310.

By the following numbered paragraphs, the function of the means constituting the devices will be described step by step.

1. The verification device 50 is invoked by a user.
2. The verification device 50 sends a pair (u, C) of challenging data and a modulus p to the challenging data storing means 511 of the proving device 51. The modulus p is stored in the access ticket public key storing means 501. On the other hand, the challenging data u and C is generated as follows. The first component u is stored in the challenge seed storing means 522, and satisfies the relation (47) for some secret random number z.

$$u = G^z \bmod p \qquad (47)$$

In the challenge seed storing means 522, one more seed C' is stored. C' satisfies the relation (48) for some crucial data K.

$$C' = Y^z K \bmod p \qquad (48)$$

Using this C' as a seed, the other component C is generated as follows. The random number generating means 502 generates a random integer r so that r and the modulus p are relatively prime (gcd(r, p)=1); the random integer r is stored in the random number storing means 503; the randomizing means 521 generates challenging data C according to the relation (49).

$$C = rC' \bmod p \qquad (49)$$

3. The first calculation means 512 of the proving device 51 calculates an intermediate result S according to the relation (50). An access ticket t to be used is stored in the access ticket storing means 513.

$$S = u^t \bmod p \qquad (50)$$

4. The exponent generation means 530 calculates F(p, e) by applying the collision-free function F to the modulus p, stored in the challenging data storing means 511, and the user identifying information e, stored in the user identifying information storing means 515.

$$F(p, e) \qquad (51)$$

5. Receiving the result from the exponent generation means 530, the second calculation means 514 of the proving device 51 calculates a differential S' according to the relation (52).

$$S' = u^{F(p, e)} \bmod p \qquad (52)$$

6. Receiving S and S' from the first calculation means 512 and the second calculation means 514, the response generation means 516 of the proving device 51 calculates a response R according to the relation (53).

$$R = S^{-1} S' C \bmod p \qquad (53)$$

In the relation (53), $S^{-1}$ denotes the reciprocal of S over the modulus p. Hence, S and $S^{-1}$ satisfy the relation (54).

$$SS^{-1} \bmod p = 1 \qquad (54)$$

7. The proving device 51 returns the generated response R to the response storing means 505 of the verification device 50.

8. The de-randomizing means 523 of the verification device 50 calculates K' according to the relation (55).

$$K' = r^{-1} R \bmod p \qquad (55)$$

In course of calculation, the means uses the random number r stored in the random number storing means 503 and the response R stored in the response storing means 505.

The straightforward implementation of the above constitution would involve the following problem: use of a common pair of seeds for challenging data (u, C') for more than one occurrences of authentication allows an attacker to construct a device which emulates the proving device 11 without the user identifying information or the access ticket. To construct such an emulator, $H = RC^{-1} \bmod p$ is recorded first where C is the challenging data at the first occurrence of authentication and R is the response to C calculated by the proving device 11. The emulator retains this H instead of the user identifying information e and the access ticket t, and on arbitrary input (u, C) issued by the verification device 10, returns to a response R calculated according to the relation $R = HC \bmod p$. Thus, the verification device 10 should have pair of seeds (u', C') as many as necessary, and should use distinct pair for distinct occurrence of authentication (Note that k for $u = G^z \bmod p$ is a random number).

Seventh Embodiment

A seventh embodiment exploits the ElGamal signature rather than the RSA public key cryptography in the first three embodiments or the ElGamal public key cryptography in the sixth embodiment.

In this embodiment, the definition of an access ticket t is given as the relation (56).

$$t = X + F(p, e) \qquad (56)$$

The following bulleted paragraphs illustrate the symbols appearing in the relation (56).

An integer p is a very large prime number.

A user identifying information e is an integer allocated to each user. The user identifying information e is unique to an individual user: a different user identifying information is allocated to a different user.

Let (X, Y) be an arbitrary ElGamal asymmetric key pair assuming p is the modulus. Therefore the relation (57) is satisfied.

$$Y = G^X \bmod p \qquad (57)$$

In the relation (57), G denotes an integer representing a generator of the multiplicative group of the finite field of order p. Equivalently, an integer G satisfies the relations (58) and (59).

$$G > 0 \qquad (58)$$

$$\min \{x > 0 | G^x = 1 \bmod p\} = p - 1 \qquad (59)$$

X is called an access ticket secret key, while Y is called an access ticket public key.

A two variable function F(x, y) is an arbitrary collision-free function. Practically, a collision-free function may be constructed using a one-way hash function h as the relation (60) shows.

$$F(x, y) = h(x|y) \qquad (60)$$

Figure 24:
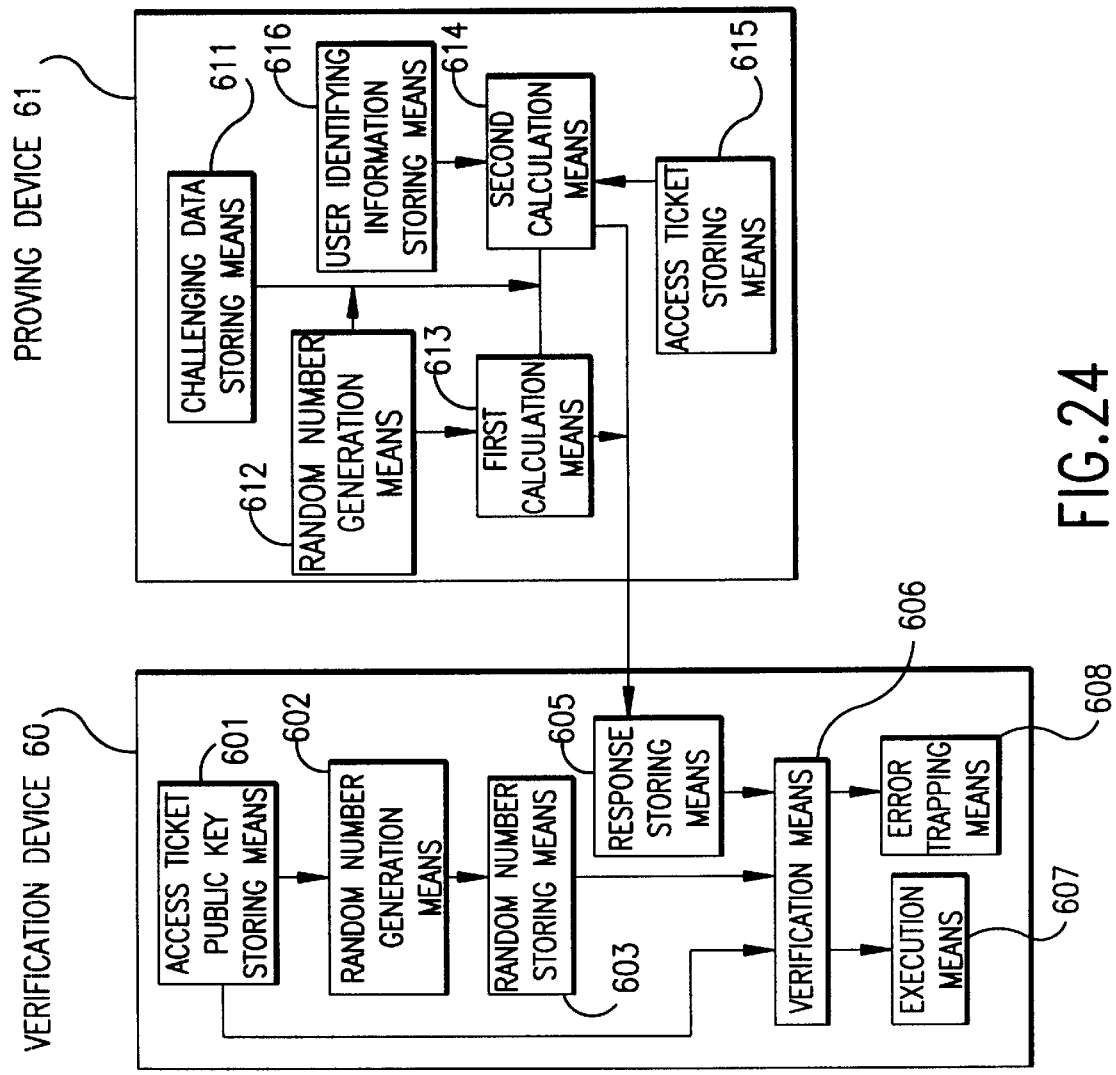
FIG. 24 is a block diagram showing the constitution of a seventh embodiment of the device for authenticating user's access rights to resources according to the present invention.
Figure 25:
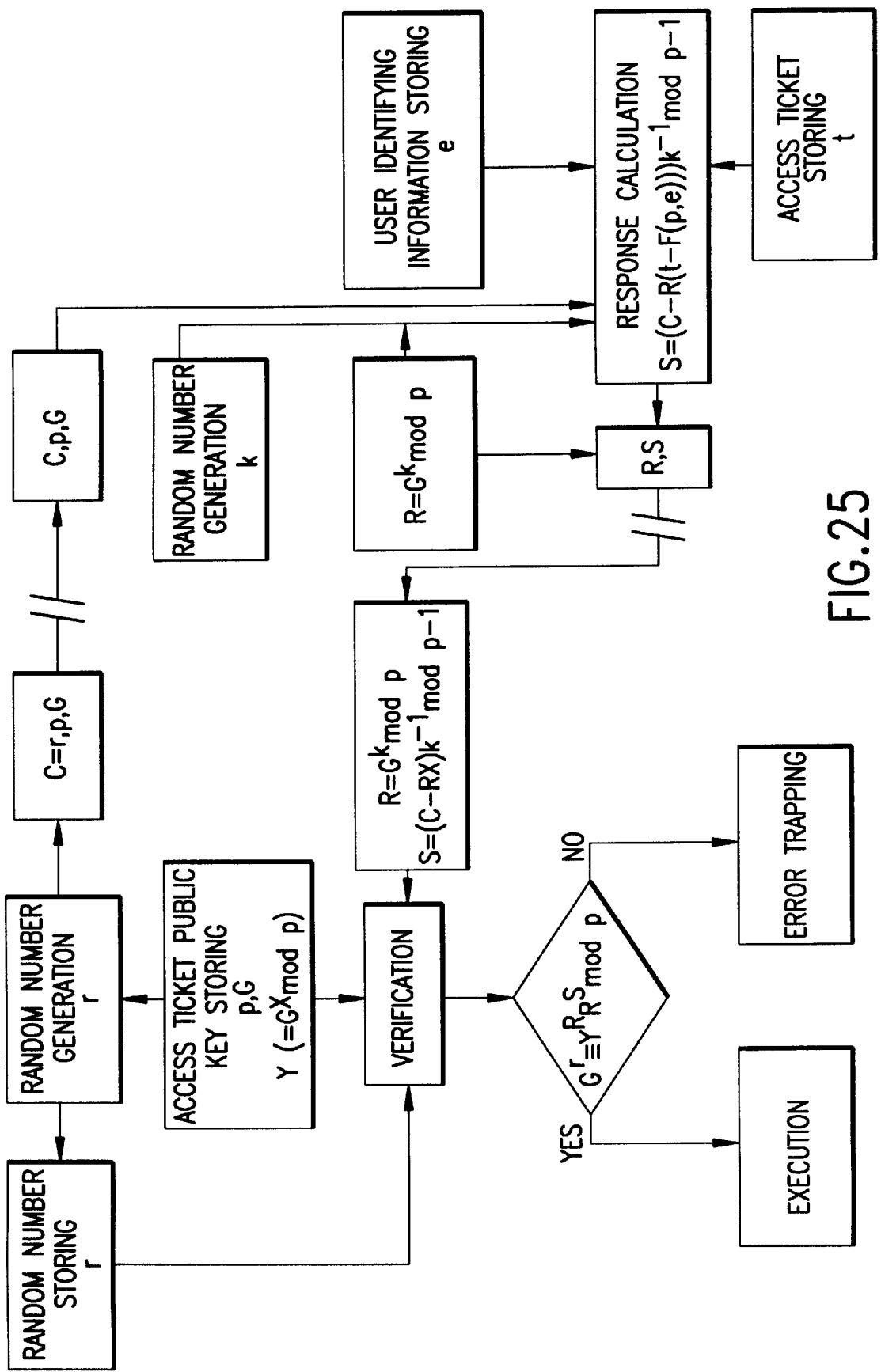
FIG. 25 is a flow chart showing functions of means constituting devices of the seventh embodiment.

FIGS. 24 and 25 are for depicting this embodiment: FIG. 24 depicts the constitution of the devices of this embodiment; FIG. 25 depicts flow of data. In FIG. 24, a proving device 61 comprises the following means: a challenging data storing means 611; a random number generation means 612; a first calculation means 613; a second calculation means 614; an access ticket storing means 615; and a user identifying information storing means 616. On the other hand, verification device 60 comprises the following means: an access ticket public key storing means 601; a random number generation means 602; a random number storing means 603; a response storing means 605; a verification means 606; a execution means 607; and an error trapping means 608.

By the following numbered paragraphs, the function of the means constituting the devices will be described step by step.

1. The verification device 60 is invoked by a user.
2. The verification device 60 sends challenging data C, a modulus p and a generator G to the challenging data storing means 611 of the proving device 61. The modulus p and the generator G are stored in the access ticket public key storing means 601. On the other hand, the challenging data u and C are generated as follows: the random number generation means 602 generates a random integer r so that r and the modulus n are relatively prime (gcd(r, n)=1); the generated random integer r is stored in the random number storing means 603; finally, the random number generation means 602 sets the value of C to r. As stated later in more detail, the response which the proving device 61 is to respond to the verification device 60 is ElGamal-signature of r with X as the signature key and p as the modulus.
3. The random number generation means 612 of the proving device 61 generates a random integer k so that k and p are relatively prime (gcd(k, p)=1). Receiving the random integer k from the random number generation means 612 and the modulus p and the generator G from the challenging data storing means 611, the first calculation means 613 calculates a first component R of a response according to the relation (61).

$$R = G^k \bmod p \tag{61}$$

Concurrently, the second calculation means 614 calculates a second component S of a response according to the relation (62).

$$S = (C - R(t - F(p, e)))k^{-1} \bmod p-1 \tag{62}$$

The access ticket t is stored in the access ticket storing means 615, and the modulus p and the challenging data C are stored in the challenging data storing means 611.

4. The proving device 61 returns the generated response R to the response storing means 605 of the verification device 60.
5. The verification means 606 of the verification device 60 examines the relation (63).

$$G^r = Y^R R^S \bmod p \tag{63}$$

The random integer r is stored in the random number storing means 603; the response pair (R, S) is stored in the response storing means 605; the modulus p, the access ticket public key Y and the generator G are all stored in the access ticket public key storing means 601.

Eighth Embodiment

An eighth embodiment provides an example of specification for ways how to generate access tickets safely.

In any case of the previous embodiments, access tickets are calculated as output of a predefined function on input of specific secret information, namely user identifying information and access ticket secret keys. Since leak of that secret information threatens the safety of the entire scheme of authentication, a safe device may be necessary in generating access tickets. Such a device is required to provide the function which absolutely prevents leakage of the secret information contained within it or results of calculations carried out within it.

One of the simplest ways to constitute such a safe device is to implement services of generating and issuing access ticket to users on an isolated computer kept safe from any attempts at illegal accesses by users: in order to protect that server computer against physical accesses by users, the computer should be placed in a room entry into which is severely controlled; further, if the server computer is networked with users' PCs and access tickets are issued to users on network, the threat of attacks via network should be taken into account; in protecting the server computer from those network attacks, the firewall technology (for details see "Building Internet Firewalls" by D. Brent Chapman and Elizabeth D. Zwicky, O'Reilly & Associates, Inc.) may be useful.

As shown in the previous embodiments, an access ticket is generated so that only the user to whom the ticket is issued can use it. Speaking more accurately, a user may succeed in authentication procedure between a verification device and a proving device if and only if he is able to feed to the proving device both an access ticket and user identifying information based on which the access ticket has been generated.

Moreover, access tickets stated in the previous embodiments satisfy a stricter standard of safety: there is no way to forge an access ticket or to construct a device which em emulates the proving device even though an attacker is assumed to be able to collect an arbitrary number of access tickets issued by legitimate access ticket issuers.

The fact that access ticket satisfies the above standard implies that access tickets are safe enough to be conveyed to users by relatively insecure means like electronic mails on Internet.

Ninth Embodiment

A ninth embodiment uses a composition method for an access ticket and user identifying information differing from those of the previous embodiments this method is different from those of the previous embodiments in that the public information associated with user identifying information is used instead of the user identifying information itself in generating an access ticket.

Therefore, according to the method stated below, a safe access ticket issuing server stated in the eighth embodiment is not necessary: a user is allowed to generate an access ticket with a program executed on his own PC or workstation. That program doesn't contain any secret information or any secret algorithm.

The identifying information of a user U is the private key $d_u$ of an RSA public key pair. By $(e_u, n_u)$, the public key corresponding to the private key $d_u$ is denoted. Hence, $n_u = p_u q_u$ for two distinct large prime numbers $p_u$ and $q_u$, and $d_u$ and $e_u$ are integers determined so as to satisfy the relations (64).

$$1 \leq d_u < (p_u-1)(q_u-1)$$

$$1 \leq e_u < (p_u-1)(q_u-1) \tag{64}$$

$e_u d_u \equiv 1 \bmod (p_u-1)(q_u-1)$

Hereafter, the condition that $n_u$ is at least as large as a constant N common to all users is further assumed.

An access ticket for a user U is composed as follows: the public key (E, n) of an RSA public key pair is taken to be the public key of the access ticket to be generated; the private key D which is paired with this public key (E, n) is taken to be the secret key of the access ticket; when the prime factorization of n is n=pq, the relations 65 is established; finally, the access ticket $t_u$ is defined by the relation (66).

$$1 \leq D < N \tag{65}$$

$$DE \equiv 1 \bmod (p-1)(q-1)$$

$$t_U = D^e{}_U \bmod n_u \tag{66}$$

In the above composition, the unique security characteristic information for authentication process is the private key D. Same as the cases in the previous embodiments, a user succeeds in authentication procedures if and only if he is able to prove that he has means to calculate a right response to challenging data issued to him by a verification device: the calculated response is right only when it is calculated based on the unique security characteristic information D.

The composition method presented in this embodiment is characterized by the property that an access ticket is encryption of the unique security characteristic information D and the user identifying information is the unique decryption key to obtain D from the access ticket. In addition, since the user identifying information is the private key of an RSA key pair, anybody who is allowed to know the public key paired with the private key can generate an access ticket for the user at will.

Figure 26:
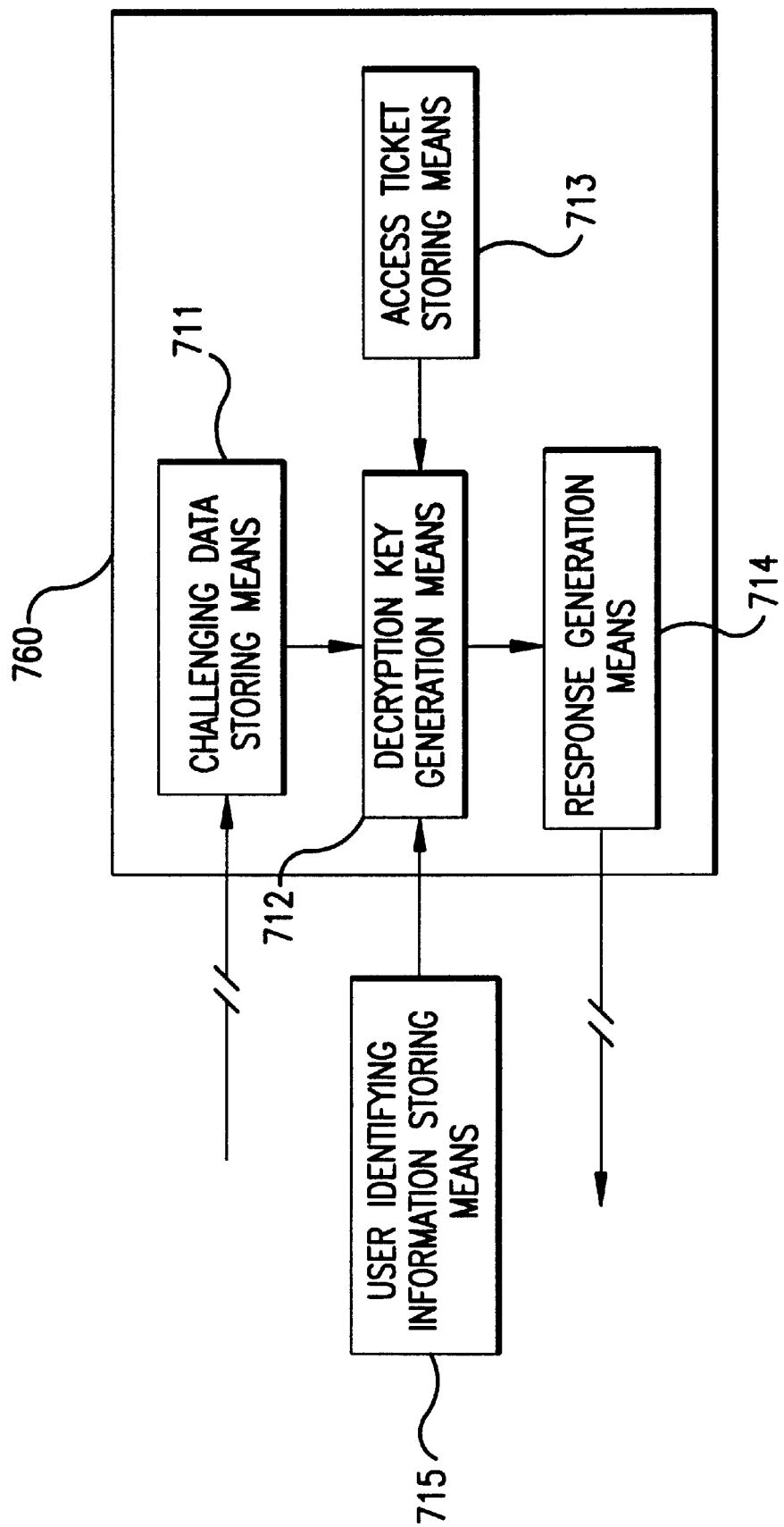
FIG. 26 is a block diagram showing a part of constitution of a proving device of ninth and tenth embodiments of the device for authenticating user's access rights to resources according to the present invention.

Hereafter, the device composition and operation of the proving device 71 are described with reference to FIG. 26.

1. A verification device 10 sends challenging data C to a challenging data storing means 711 of a proving device 11.

2. A decryption key generation means 712 of the proving device 11 acquires user identifying information $d_u$ which is stored in a user identifying information storing means 715 and an access ticket $t_u$ which is stored in an access ticket storing means 713, and then calculates D' according to the relation (67).

$$D' = t_u{}^{du} \bmod n_u \tag{67}$$

3. On input of D' calculated by the decryption key generation means 712 and the challenging data C stored in the challenging data storing means 711, a response generation means 714 of the proving device 71 calculates a response R according to the relation (68). The calculated response R is returned to the verification device 10.

$$R = C^{D'} \bmod n \tag{68}$$

4. The verification device 10 verifies the legitimacy of the response R.

The access ticket secret key D in the definition of the access ticket $t_u = D^e{}_u \bmod n_u$ must be kept secret to the user U. Therefore, the user identifying information storing means 713, the decryption key generation means 712 and the response generation means 714 are to be incorporated in a defense means 760 which is a tamper-resistant hardware.

The same as the cases of the previous embodiments, the verification device authenticates access rights of the user if and only if he has the right pair of the ticket $t_u$ and the user identifying information e.

Tenth Embodiment

A tenth embodiment is substantially the same as the ninth embodiment, except that a response R is calculated using a symmetric key cipher instead of using the RSA public key cryptography as in the ninth embodiment and an access ticket is RSA-encryption of the decryption key (same as the encryption key) D of the symmetric key cipher. As the encryption key to generate the access ticket, the public key $(e_u, n_u)$ and the RSA algorithm is used.

When the encryption function of the symmetric key encryption is expressed as Encrypt (key, plain message: the output of this function being the cipher message of the plain message which is the second argument of the function) and the decryption function is expressed as Decrypt (key, cipher message: the output being the plain message corresponding to the cipher message which is the second argument of the function), the challenging data C is defined by relation (69).

$$C = \text{Encrypt} (D, K) \tag{69}$$

Furthermore, the access ticket $t_u$ is defined by the relation (70).

$$t_u = D^{eu} \bmod n_u \tag{70}$$

Hereafter, the operation of the proving device 11 is described with reference to FIG. 26.

1. A verification device 10 sends challenging data C to a challenging data storing means 711.

2. A decryption key generation means 712 of the proving device 11 acquires user identifying information $d_u$ which is stored in a user identifying information storing means 715 and an access ticket $t_u$ which is stored in an access ticket storing means 713, and then calculates D' according to the relation (71).

$$D' = t_u{}^{du} \bmod n_u \tag{71}$$

3. On input of D' calculated by the decryption key generation means 712 and the challenging data C stored in the challenging data storing means 711, a response generation means 714 of the proving device 11 calculates a response R according to the relation (72). The calculated response R is sent back to the verification device 10.

$$R = \text{Decrypt} (D'C) \tag{72}$$

4. The verification device 10 verifies the legitimacy of the response R.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for authenticating user's access rights to resources comprising:

first memory means for storing challenging data;

second memory means for storing unique identifying information of the user;

third memory means for storing proof support information which is a result of executing predetermined computations to the user unique identifying information and unique security characteristic information of the device;

response generation means for generating a response from the challenging data stored in the first memory means, the unique identifying information of the user stored in the second memory means, and the proof support information stored in the third memory means; and verification means for verifying the legitimacy of the response by verifying that the response, the challenging data and the unique security characteristic information of the device satisfy a specific predefined relation.

2. The device for authenticating user's access rights to resources of claim 1 further comprising:

protect means for preventing any data inside from being observed or being tampered with from the outside, at least confining the second memory means and the response generation means.

3. The device for authenticating user's access rights to resources of claim 1, wherein at least the second memory means and the response generation means are implemented within a small portable device such as a smart card.

4. The device for authenticating user's access rights to resources of claim 1, wherein the response generation means comprises:

first calculation means for replaying the unique security characteristic information of the device by executing predetermined calculations to the unique identifying information of the user stored in the second memory means and the proof support information stored in the third memory means; and second calculation means for generating a response by executing predetermined calculations to the challenging data stored in the first memory means and the unique security characteristic information of the device replayed by the first calculation means.

5. The device for authenticating user's access rights to resources of claim 1, wherein the response generation means comprises:

third calculation means for generating first intermediate information by executing predetermined calculations to the challenging data stored in the first memory means and the proof support information stored in the third memory means;

fourth calculation means for generating second intermediate information by executing predetermined calculations to the challenging data stored in the first memory means and the user unique identifying information stored in the second memory means; and fifth calculation means for generating a response by executing predetermined calculations to the first intermediate information generated by the third calculation means and the second intermediate information generated by the fourth calculation means.

6. The device for authenticating user's access rights to resources of claim 5, further comprising:

protect means for preventing any data inside from being observed or being tampered with from the outside, at least confining the second memory means and the fourth calculation means.

7. The device for authenticating user's access rights to resources of claim 5, wherein at least the second memory means and the fourth calculation means are implemented within a portable device such as a smart card.

8. The device for authenticating user's access rights to resources of claim 1, wherein the unique security characteristic information of the device is a decryption key of a cipher function, the challenging data is encryption of information using the cipher function with the encryption key corresponding to the decryption key, and the verification means verifies the legitimacy of the response by verifying that the response generated by the response generation means is identical with decryption of the challenging data with the decryption key.

9. The device for authenticating user's access rights to resources of claim 1, wherein the unique security characteristic information of the device is an encryption key of a cipher function, and the verification means verifies the legitimacy of the response by verifying that the response generated by the response generation means is identical with encryption of the challenging data with the encryption key.

10. The device for authenticating user's access rights to resources of claim 1, wherein the characteristic information of the device is the signature key of a digital signature function, and the verification means verifies the legitimacy of the response by verifying that the response generated by the response generation means is identical with the digital signature for the challenging data, which is calculated with the signature key.

11. The device for authenticating user's access rights to resources of claim 8, wherein the cipher function is of the asymmetric key cryptography, and the unique security characteristic information of the device is one component of the key pair of the cipher function.

12. The device for authenticating user's access rights to resources of claim 9, wherein the cipher function is of the asymmetric key cryptography, and the unique security characteristic information of the device is one component of the key pair of the cipher function.

13. The device for authenticating user's access rights to resources of claim 11, wherein the cipher function is of the public key cryptography, and the unique security characteristic information of the device is the private key of the public key pair of the cipher function.

14. The device for authenticating user's access rights to resources of claim 12, wherein the cipher function is of the public key cryptography, and the unique security characteristic information of the device is the private key of the public key pair of the cipher function.

15. The device for authenticating user's access rights to resources of claim 8, wherein the cipher function is of the symmetric key cryptography, and the unique security characteristic information of the device is the common key of the cipher function.

16. The device for authenticating user's access rights to resources of claim 9, wherein the cipher function is of the symmetric key cryptography, and the unique security characteristic information of the device is the common key of the cipher function.

17. The device for authenticating user's access rights to resources of claim 1, further comprising:

a proving device having the first memory means, the second memory means, the third memory means and the response generation means; and a verification device having fourth memory means for storing the challenging data, fifth memory means for storing the response and the verification means, wherein the verification device transfers the challenging data stored in the fourth memory means to the first memory means of the proving device, the proving device transfers the response generated by the response generation means to the fifth memory means of the verification device, and the verification means of the verification device verifies the legitimacy of the response stored in the fifth memory means.

18. The device for authenticating user's access rights to resources of claim 17, wherein the unique security characteristic information of the device is an encryption key of a cipher function, the verification device comprises random number generation means for generating a random number and for storing it in the fourth memory means, and the verification means verifies the legitimacy of the response by verifying that the response stored in the fifth memory means is identical with encryption of the challenging data stored in the fourth memory means with the encryption key.

19. The device for authenticating user's access rights to resources of claim 17, wherein the unique security characteristic information of the device is a decryption key of a cipher function, the verification device comprises random number generation means for generating a random number, sixth memory means for storing the generated random number and seventh memory means for storing a seed for challenging data, and wherein the random number generation means stores the generated random number in the sixth memory means while randomizing the seed for the challenging data stored in the seventh memory means by executing predefined calculations to the random number stored in the sixth memory means and the seed stored in the seventh memory means and then storing the randomized seed as challenging data in the fourth memory means, and the verification means of the verification device de-randomizes the response stored in the fifth memory means by executing predefined calculations to the random number stored in the sixth memory means and the response stored in the fifth memory means, and then verifies the legitimacy of the de-randomized response by verifying that the de-randomized result is identical with decryption of the seed stored in the seventh memory means with the decryption key which is the unique security characteristic information of the device.

20. The device for authenticating user's access rights to resources of claim 17, wherein the unique security characteristic information of the device is the signature key of a digital signature function, and the verification device comprises random number generation means for generating a random number and storing the generated random number as challenging data in the fourth memory means, and wherein the verification means of the verification device verifies the legitimacy of the response by verifying that the response stored in the fifth memory means is identical with the digital signature for the challenging data stored in the fourth memory means, which is calculated with the signature key which is the unique security characteristic information of the device.

21. The device for authenticating user's access rights to resources of claim 18, wherein the unique security characteristic information of the device is the private key D of an RSA public key pair with a modulus n, and the verification means verifies the legitimacy of the response by verifying that the E-th power of the response R stored in the fifth memory means, where E denotes the public key associated with the private key D, is congruent with the challenging data C stored in the fourth memory means modulo n ($R^E$ mod n=C mod n).

22. The device for authenticating user's access rights to resources of claim 19, wherein the unique security characteristic information of the device is the private key D of an RSA public key pair with a modulus n, a seed C' for challenging data stored in the seventh memory means is an RSA-encryption of data K with the public key E of the RSA public key pair (DE mod$\phi$(n)=1, C'=$K^E$ mod n), a random number r generated by the random number generation means is stored in the sixth memory means, challenging data C generated and stored in the fourth memory means satisfies the relation C=$r^E$C' mod n, and the verification means verifies the legitimacy of the response R stored in the fifth memory means by verifying that the quotient of R divided by r modulo n is congruent with the data K modulo n (K mod n=$r^{-1}$ R mod n).

23. The device for authenticating user's access rights to resources of claim 21, wherein a proof support information t stored in the third memory means satisfies the relation t=D−e+w$\phi$(n), where e denotes user unique identifying information stored in the second memory means, w denotes a conflict-free random number determined dependent upon both n and e and $\phi$ (n) denotes the Euler number of n, and the response generated by response generation means is identical with the D-th power of challenging data C stored in the first memory means modulo n (R=$C^D$ mod n).

24. The device for authenticating user's access rights to resources of claim 22, wherein a proof support information t stored in the third memory means satisfies the relation t=D−e+w$\phi$(n), where e denotes user unique identifying information stored in the second memory means, w denotes a conflict-free random number determined dependent upon both n and e and $\phi$ (n) denotes the Euler number of n, and the response generated by response generation means is identical with the D-th power of challenging data C stored in the first memory means modulo n (R=$C^D$ mod n).

25. The device for authenticating user's access rights to resources of claim 23, wherein the response generation means further comprises:
third calculation means for calculating the t-th power of challenging data C stored in the first memory means modulo n ($C^t$ mod n), where t denotes proof support information stored in the third memory means;

fourth calculation means for calculating the e-th power of the challenging data C modulo n ($C^e$ mod n), where e denotes user unique identifying information stored in the second memory means; and fifth calculation means for calculating a response R by multiplying the result calculated by the third calculation means by the result calculated by the fourth calculation means modulo n (R=$C^t C^e$ mod n).

26. The device for authenticating user's access rights to resources of claim 24, wherein the response generation means further comprises:

third calculation means for calculating the t-th power of challenging data C stored in the first memory means modulo n ($C^t$ mod n), where t denotes proof support information stored in the third memory means;

fourth calculation means for calculating the e-th power of the challenging data C modulo n ($C^e$ mod n), where e denotes user unique identifying information stored in the second memory means; and fifth calculation means for calculating a response R by multiplying the result calculated by the third calculation means by the result calculated by the fourth calculation means modulo n (R=$C^t C^e$ mod n).

27. The device for authenticating user's access rights to resources of claim 25, further comprising:

protect means for preventing any data inside from being observed or being tampered with from the outside, confining the second memory means and the fourth calculation means.

28. The device for authenticating user's access rights to resources of claim 26, further comprising:

protect means for preventing any data inside from being observed or being tampered with from the outside, confining the second memory means and the fourth calculation means.

29. The device for authenticating user's access rights to resources of claim 21, wherein proof support information t stored in the third memory means satisfies the relation t=D+F(n, e), where e denotes user unique identifying information stored in the second memory means, and F(x, y) denotes a two-variable collision-free function, and a response generated by the response generation means is identical with the D-th power of challenging data C stored in the first memory means modulo n (R=$C^D$ mod n).

30. The device for authenticating user's access rights to resources of claim 22, wherein proof support information t stored in the third memory means satisfies the relation t=D+F(n, e), where e denotes the user unique identifying information stored in the second memory means, and F(x, y) denotes a two-variable collision-free function, and a response generated by the response generation means is identical with the D-th power of challenging data C stored in the first memory means modulo n (R=$C^D$ mod n).

31. The device for authenticating user's access rights to resources of claim 29, wherein the response generation means further comprises:

third calculation means for calculating the t-th power of challenging data C stored in the first memory means modulo n, where t denotes the proof support information stored in the third memory means ($C^t$ mod n);

fourth calculation means for calculating the F(n, e)-th power of the challenging data C modulo n ($C^{F(n, e)}$ mod n), where e denotes the user unique identifying information stored in the second memory means and F(x, y) denotes a two-variable collision-free function; and fifth calculation means for calculating a response R by dividing the result calculated by the third calculation means by the result calculated by the fourth calculation means modulo n (R=$C^t C^{-F(n, e)}$ mod n).

32. The device for authenticating user's access rights to resources of claim 30, wherein the response generation means further comprises:

third calculation means for calculating the t-th power of challenging data C stored in the first memory means modulo n, where t denotes proof support information stored in the third memory means ($C^t$ mod n);

fourth calculation means for calculating the F(n, e)-th power of the challenging data C modulo n ($C^{F(n, e)}$ mod n), where e denotes user unique identifying information stored in the second memory means and F(x, y) denotes a two-variable collision-free function; and fifth calculation means for calculating a response R by dividing the result calculated by the third calculation means by the result calculated by the fourth calculation means modulo n (R=$C^t C^{-F(n, e)}$ mod n).

33. The device for authenticating user's access rights to resources of claim 31, further comprising:

protect means for preventing any data inside from being observed or being tampered with from the outside, confining the second memory means and the fourth calculation means.

34. The device for authenticating user's access rights to resources of claim 32, further comprising:

protect means for preventing any data inside from being observed or being tampered with from the outside, confining the second memory means and the fourth calculation means.

35. The device for authenticating user's access rights to resources of claim 18, wherein the unique security characteristic information of the device is a key D of a Pohlig-Heilman key pair of a modulus p, and the verification means verifies the legitimacy of the response by verifying that the E-th power of the response R stored in the fifth memory means, where E denotes the counterpart key of the key D (DE mod (p−1)=1), is congruent with the challenging data C stored in the fourth memory means modulo p ($R^E$ mod p=C mod p).

36. The device for authenticating user's access rights to resources of claim 19, wherein the unique security characteristic information of the device is a key D of a Pohlig-Hellman key pair of a modulus p, a seed C' for challenging data stored in the seventh memory means is Pohlig-Hellman-encryption of data K with the counterpart key E of the key D (DE mod (p−1)=1, C'=$K^E$ mod p), a random number r generated by the random number generation means is stored in the sixth memory means, challenging data C stored in the fourth memory means satisfies the relation C=$r^E$C' mod p, and the verification means verifies the legitimacy of the response R stored in the fifth memory means by verifying that the quotient of R divided by r modulo p is congruent with the data K modulo p ($K \bmod p = r^{-1} R \bmod p$).

37. The device for authenticating user's access rights to resources of claim 35, wherein proof support information t stored in the third memory means satisfies the relation $t=D+F(p, e)$, where e denotes the user unique identifying information stored in the second memory means, and $F(x, y)$ denotes a two-variable collision-free function, and a response generated by the response generation means is identical with the D-th power of challenging data C stored in the first memory means modulo p ($R=C^D \bmod p$).

38. The device for authenticating user's access rights to resources of claim 36, wherein proof support information t stored in the third memory means satisfies the relation $t=D+F(p, e)$, where e denotes the user unique identifying information stored in the second memory means, and $F(x, y)$ denotes a two-variable collision-free function, and a response generated by the response generation means is identical with the D-th power of challenging data C stored in the first memory means modulo p ($R=C^D \bmod p$).

39. The device for authenticating user's access rights to resources of claim 37, wherein the response generation means further comprises:
third calculation means for calculating the t-th power of challenging data C stored n the first memory means modulo p, where t denotes the proof support information stored in the third memory means ($C^t \bmod p$);
fourth calculation means for calculating the $F(p, e)$-th power of the challenging data C modulo p ($C^{F(p, e)} \bmod p$), where e denotes the user unique identifying information stored in the second memory means and $F(x, y)$ denotes a two-variable collision-free function; and
fifth calculation means for calculating a response R by dividing the result calculated by the third calculation means by the result calculated by the fourth calculation means modulo p ($R=C^t C^{-F(p, e)} \bmod p$).

40. A device for authenticating user's access rights to resources of claim 38, wherein the response generation means further comprises:
third calculation means for calculating the t-th power of challenging data C stored in the first memory means modulo p, where t denotes the proof support information stored in the third memory means ($C^t \bmod p$);
fourth calculation means for calculating the $F(p, e)$-th power of the challenging data C modulo p ($C^{F(p, e)} \bmod p$), where e denotes the user unique identifying information stored in the second memory means and $F(x, y)$ denotes a two-variable collision-free function; and
fifth calculation means for calculating a response R by dividing the result calculated by the third calculation means by the result calculated by the fourth calculation means modulo p ($R=C^t C^{-F(p, e)} \bmod p$).

41. The device for authenticating user's access rights to resources of claim 39, further comprising:

protect means for preventing any data inside from being observed or being tampered with from the outside, confining the second memory means and the fourth calculation means.

42. The device for authenticating user's access rights to resources of claim 40, further comprising:

protect means for preventing any data inside from being observed or being tampered with from the outside, confining the second memory means and the fourth calculation means.

43. The device for authenticating user's access rights to resources of claim 19, wherein the unique security characteristic information of the device is the private key X of an ElGamal public key pair with a modulus p and a generator G, the public key Y corresponding to X is the X-th power of G modulo p ($Y=G^X \bmod p$), u denotes the z-th power of the modulo p ($u=G^z \bmod p$) for a random number z, K' denotes the product modulo p of the z-th power of Y modulo p and a data K ($K'=Y^z K \bmod p$), the seventh memory means retains the pair of u and K', a random number r generated by the random generation means is stored in the sixth memory means, C denotes the product modulo p of K' and r ($C=rK' \bmod p$), the fourth memory means retains the pair C and u, and the verification means verifies the legitimacy of the response R stored in the fifth memory means by verifying that the quotient of R divided by r modulo p is congruent with K modulo p ($K \bmod p = r^{-1} R \bmod p$).

44. The device for authenticating user's access rights to resources of claim 43, wherein proof support information t stored in the third memory means satisfies the relation $t=X+F(p, e)$, where e denotes the user unique identifying information stored in the second memory means and $F(x, y)$ denotes a two-variable collision-free function, and a response R generated by the response generation means is identical with the quotient of C divided by X-th power of u modulo p ($R=u^{-x}C \bmod p$), where the pair C and u is the challenging data stored in the first memory means.

45. The device for authenticating user's access rights to resources of claim 44, wherein the response generation means further comprises:
third calculation means for calculating the t-th power of the component u of the challenging data pair stored in the first memory means modulo p, where t denotes proof support information stored in the third memory means ($u^t \bmod p$);
fourth calculation means for calculating the $F(p, e)$-th power of u modulo p ($u^{F(p, e)} \bmod p$), where e denotes the user unique identifying information stored in the second memory means and $F(x, y)$ denotes a two-variable collision-free function; and
fifth calculation means for calculating a response R by dividing the product of the other component C of the challenging data pair and the result calculated by the fourth calculation means by the result calculated by the third calculation means modulo p ($R=Cu^{F(p, e)} u^{-t} \bmod p$).

46. The device for authenticating user's access rights to resources of claim 45, further comprising:

protect means for preventing any data inside from being observed or being tampered with from the outside, confining the second memory means and the fourth calculation means.

47. The device for authenticating user's access rights to resources of claim 20, wherein the unique security characteristic information of the device is the signature key X of an ElGamal public key pair with a modulus p and a generator G, the public key Y corresponding to X is the X-th power of G modulo p ($Y=G^X$ mod p), a response stored in the fifth memory means is a pair of R and S, and the verification means verifies the legitimacy of the response R stored in the fifth memory means by verifying that the C-th power of G for the challenging data C stored in the fourth memory means is congruent modulo p with the product of the R-th power of Y and the S-th power of R ($G^c$ mod $p=Y^R R^S$ mod p).

48. The device for authenticating user's access rights to resources of claim 47, wherein proof support information t stored in the third memory means satisfies the relation t=X+F(p, e), where e denotes the user unique identifying information stored in the second memory means, and F(x, y) denotes a two-variable collision-free function, and the response generation means generates a response pair R and S by carrying out the following steps of:
generating a random number k;
calculating R as the k-th power of G modulo p ($R=G^k$ mod p); and
calculating S according to the relation $S=(C-RX)k^{-1}$ mod (p-1).

49. The device for authenticating user's access rights to resources of claim 48, further comprising:

protect means for preventing any data inside from being observed or being tampered with from the outside, confining the second memory means and the fourth calculation means.

50. The device for authenticating user's access rights to resources of claim 4, wherein the user unique identifying information stored in the second memory means is a decryption key of a cipher function, the proof support information stored in the third memory means is an encryption of the unique security characteristic information of the device with the encryption key corresponding the decryption key, and the first calculation means calculates the unique security characteristic information of the device by decrypting the proof support information stored in the third memory means with the decryption key stored in the second memory means.

51. The device for authenticating user's access rights to resources of claim 50, wherein the cipher function is of the asymmetric key cryptography, and the user unique identifying information is a component of the key pair of the cipher function.

52. The device for authenticating user's access rights to resources of claim 51, wherein the cipher function is of the public key cryptography, and the user unique identifying information is the private key of the public key pair of the cipher function.

53. The device for authenticating user's access rights to resources of claim 50, wherein the cipher function is of the symmetric key cryptography, and the user unique identifying information is the common secret key of the cipher function.

54. The device for authenticating user's access rights to resources of claim 8, wherein the verification device further comprises:

eighth memory means for storing a clear data encryption of which is the challenging data stored in the first memory means; and comparison means for examining whether the clear data stored in the eighth memory means is identical with data inputted to the comparison means, and wherein the verification means feeds the response stored in the fifth memory means to the comparison means, receives the answer from the comparison means, and thereby the verification means verifies the legitimacy of the response if and only if the received answer shows that the clear data stored in the eighth memory means is identical with the data inputted to the comparison means.

55. The device for authenticating user's access rights to resources of claim 19, wherein the verification device further comprises:

eighth memory means for storing clear data encryption of which is the seed for challenging data stored in the seventh memory means; and comparison means for examining whether the clear data stored in the eighth memory means is identical with data inputted to the comparison means, and wherein the verification means feeds the de-randomized value of the response stored in the fifth memory means to the comparison means, receives the answer from the comparison means, and thereby the verification means verifies the legitimacy of the response if and only if the received answer shows that the clear data stored in the eighth memory means is identical with the de-randomized value of the response inputted to the comparison means.

56. The device for authenticating user's access rights to resources of claim 8, wherein the verification device further comprises:

ninth memory means for storing a value obtained by applying a one-way function to clear data encryption of which is the challenging data stored in the seventh memory means;

sixth calculation means for outputting a value calculated by applying the one-way function to an inputted data; and comparison means for examining whether the value stored in the ninth memory means is identical with data inputted to the comparison means, and wherein the verification means feeds the response to the sixth calculation means, receives a result from the sixth calculation means, feeds the result to the comparison means and receives an answer from the comparison means, and thereby the verification means verifies the legitimacy of the response if and only if the received answer shows that the result of the calculation by the sixth calculation means is identical with the data stored in the ninth memory means.

57. The device for authenticating user's access rights to resources of claim 19, wherein the verification device further comprises:

ninth memory means for storing a value obtained by applying a one-way function to clear data encryption of which is a seed for the challenging data stored in the seventh memory means;

sixth calculation means for outputting a value calculated by applying the one-way function to inputted data, and comparison means for examining whether the value stored in the ninth memory means is identical with data inputted to the comparison means, and wherein the verification means feeds the de-randomized value of the response to the sixth calculation means, receives a result from the sixth calculation means, feeds the result to the comparison means and receives an answer from the comparison means, and thereby the verification means verifies the legitimacy of the response if and only if the received answer shows that the result of the calculation by the sixth calculation means is identical with the data stored in the ninth memory means.

58. The device for authenticating user's access rights to resources of claim 8, wherein the verification device further comprises:
program execution means for executing code of a program encryption of which is the challenging data stored in the seventh memory means, and wherein the verification means feeds the response stored in the fifth memory means as program code to the program execution means, and the program execution means correctly functions if and only if the response generation means correctly decrypts the challenging data which is an encryption of the code of the program, that is, the encryption of the program is correctly decrypted.

59. The device for authenticating user's access rights to resources of claim 19, wherein the verification device further comprises:
program execution means for executing code of a program encryption of which is the seed for challenging data stored in the seventh memory means, and wherein the verification means feeds the de-randomized value of the response stored in the fifth memory means as program code to the program execution means, and the program execution means correctly functions if and only if the response generation means correctly decrypts the seed for challenging data which is an encryption of the code of the program, that is, the encryption of the program is correctly decrypted.

60. The device for authenticating user's access rights to resources of claim 8, wherein the verification device further comprises:
program execution means;
program storing means; and
program decryption means, and wherein the program storing means stores code of a program a part or all of which is encrypted, an encryption of the decryption key for the partial or whole encrypted program code is the challenging data stored in the seventh memory means, the verification means feeds the response to the program decryption means, the program decryption means decrypts the program stored in the program storing means with the response as a decryption key, and the program execution means correctly executes the decrypted program if and only if the response generation means correctly decrypts the challenging data, that is, the decryption key for decrypting the encryption of the program is correctly decrypted.

61. The device for authenticating user's access rights to resources of claim 19, wherein the verification device further comprises:
program execution means;
program storing means; and
program decryption means, and wherein the program storing means stores code of a program a part or all of which is encrypted, an encryption of the decryption key for the partial or whole encrypted program code is the seed for challenging data stored in the seventh memory means, the verification means feeds the de-randomized value of the response to the program decryption means, the program decryption means decrypts the program stored in the program storing means with the response as a decryption key, and the program execution means correctly executes the decrypted program if and only if the response generation means correctly decrypts the seed for the challenging data, that is, the decryption key for decrypting the encryption of the program is correctly decrypted.

62. The device for authenticating user's access rights to resources of claim 17, wherein the proving device and the verification device are installed in a box material, and the verification device transfers the challenging data stored in the fourth memory means to the first memory means of the proving device and the proving device transfers the response generated by the response generation means to the fifth memory means of the verification device without using a communication network outside of the box material.

63. A method for authenticating user's access rights to resources by verifying the legitimacy of a response generated from challenging data for proving the user's access rights, comprising:

a step for storing the challenging data;

a step for storing unique identifying information of the user;

a step for storing proof support information which is a result of predetermined computations to the unique identifying information of the user and unique security characteristic information;

a step for generating a response by executing predetermined computations to the challenging data, the unique identifying information of the user and the proof support information; and a step for verifying the legitimacy of the response by verifying that the response, the challenging data and the unique security characteristic information satisfy a specific predefined relation.

64. A computer program product for use with a computer, the computer program product comprising:

a computer usable medium having computer readable program code means embodied in the medium for causing the computer to authenticate user's access rights to resources by verifying the legitimacy of a response generated from challenging data for proving the user's access rights, the computer program product having:

computer readable program code means for causing the computer to store the challenging data;

computer readable program code means for causing the computer to store unique identifying information of the user;

computer readable program code means for causing the computer to store proof support information which is a result of predetermined computations to the unique identifying information of the user and unique security characteristic information;

computer readable program code means for causing the computer to generate a response by executing a predetermined computations to the challenging data, the unique identifying information of the user and the proof support information; and computer readable program code means for causing the computer to verify the legitimacy of the response by verifying that the response, the challenging data and the unique security characteristic information satisfy a specific predefined relation.

65. A computer program product for use with a computer, the computer program product comprising:

a computer usable medium having computer readable program code means embodied in the medium for causing the computer to generate a response from challenging data, the legitimacy of which is to be verified for authenticating user's access rights, the computer program product having:

computer readable program code means for causing the computer to store the challenging data;

computer readable program code means for causing the computer to store unique identifying information of the user;

computer readable program code means for causing the computer to store proof support information which is a result of predetermined computations to the unique identifying information of the user and unique security characteristic information; and computer readable program code means for causing the computer to generate a response by executing predetermined computations to the challenging data, the unique identifying information of the user and the proof support information.

66. A program execution control device for authenticating user's access rights to resources by verifying the legitimacy of a response generated from challenging data for proving the user's access rights and controlling execution of a program based on the authentication of the user's access rights, comprising:

first memory means for storing challenging data;

second memory means for storing unique identifying information of the user;

third memory means for storing proof support information which is a result of predetermined computations to the unique identifying information of the user and unique security characteristic information of the device;

response generation means for generating a response by executing predetermined computations to the challenging data, the unique identifying information of the user and the proof support information;

verification means for verifying the legitimacy of the response by verifying that the response, the challenging data and the unique security characteristic information satisfy a specific predefined relation; and continuation means for continuing execution of the program if the legitimacy of the response is verified.

67. An information processing apparatus for authenticating user's access rights to specific information processing resources by verifying the legitimacy of a response generated for proving the user's access rights and permitting access to the specific information processing resources, comprising:

first memory means for storing challenging data;

second memory means for storing unique identifying information of the user;

third memory means for storing proof support information which is a result of predetermined computations to the unique identifying information of the user and unique security characteristic information;

response generation means for generating a response by executing predetermined computations to the challenging data, the unique identifying information of the user and the proof support information;

verification means for verifying the legitimacy of the response by verifying that tho response, the challenging data and the unique security characteristic information satisfy a specific predefined relation; and permission means for permitting access to the specific information processing resources if the legitimacy of the response is verified.

* * * * *